US009646144B2

(12) United States Patent
Tharappel et al.

(10) Patent No.: US 9,646,144 B2
(45) Date of Patent: May 9, 2017

(54) EXTENDING USER AUTHENTICATION ACROSS A TRUST GROUP OF SMART DEVICES

(71) Applicant: Intel Corporation, Santa Clara, CA (US)

(72) Inventors: Francis M. Tharappel, Portland, OR (US); Saurin S. Shah, Portland, OR (US); Lakshman Krishnamurthy, Portland, OR (US); Saurabh Dadu, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 127 days.

(21) Appl. No.: 14/142,795

(22) Filed: Dec. 28, 2013

(65) Prior Publication Data

US 2015/0186636 A1    Jul. 2, 2015

(51) Int. Cl.
| | |
|---|---|
| G06F 21/00 | (2013.01) |
| G06F 21/32 | (2013.01) |
| H04L 9/32 | (2006.01) |
| G06F 21/41 | (2013.01) |
| H04W 12/08 | (2009.01) |
| H04W 12/06 | (2009.01) |
| G06F 21/35 | (2013.01) |

(Continued)

(52) U.S. Cl.
CPC .......... *G06F 21/32* (2013.01); *G06F 21/35* (2013.01); *G06F 21/41* (2013.01); *H04L 9/3231* (2013.01); *H04W 12/06* (2013.01); *H04W 12/08* (2013.01); *G06F 21/629* (2013.01); *G06F 2221/2117* (2013.01); *H04L 63/0861* (2013.01)

(58) Field of Classification Search
None
See application file for complete search history.

(56) References Cited

U.S. PATENT DOCUMENTS

2005/0149758 A1 *  7/2005  Park ................... H04L 9/3236
                                                         726/4
2005/0221798 A1 * 10/2005  Sengupta et al. ............ 455/411
(Continued)

FOREIGN PATENT DOCUMENTS

WO    WO 2013-145166 A1   10/2013
WO    WO 2015/100210 A1    7/2015

OTHER PUBLICATIONS

International Search Report and Written Opinion in International Application No. PCT/US2014/071817, mailed on Mar. 31, 2015, 11 pages.

*Primary Examiner* — Dao Ho
*Assistant Examiner* — Andrew Steinle
(74) *Attorney, Agent, or Firm* — Patent Capital Group

(57) ABSTRACT

Particular embodiments described herein provide for a wearable electronic device with a biometric sensor and logic. At least a portion of the logic is implemented in hardware. The logic is configured to receive input data indicative of biometric input and attempt to authenticate the input data based, at least in part, on at least one biometric credential of an authorized user. The logic is configured to establish a wireless connection to a smart device, determine whether the smart device is included in a trust group of one or more smart devices, and send a communication to unlock the smart device when the input data is successfully authenticated and when the trust group includes the smart device.

25 Claims, 10 Drawing Sheets

(51) Int. Cl.
G06F 21/62 (2013.01)
H04L 29/06 (2006.01)

(56) References Cited

U.S. PATENT DOCUMENTS

| | | | |
|---|---|---|---|
| 2005/0286722 A1* | 12/2005 | Aboba | H04L 63/04 |
| | | | 380/277 |
| 2008/0216171 A1* | 9/2008 | Sano et al. | 726/19 |
| 2011/0162053 A1* | 6/2011 | Pei et al. | 726/6 |
| 2012/0206335 A1* | 8/2012 | Osterhout et al. | 345/156 |
| 2012/0317024 A1 | 12/2012 | Rahman et al. | |
| 2014/0089672 A1* | 3/2014 | Luna et al. | 713/186 |

* cited by examiner

EXTENDING USER AUTHENTICATION ACROSS A TRUST GROUP OF SMART DEVICES

TECHNICAL FIELD

Embodiments described herein generally relate to user authentication on electronic devices and, more particularly to extending user authentication across a trust group of smart devices.

BACKGROUND

End users have more electronic device choices than ever before. A number of prominent technological trends are currently afoot (e.g., mobile electronic devices, smaller electronic devices, increased user connectivity, etc.), and these trends are changing the electronic device landscape. One of the technological trends is enhanced user mobility/connectivity through multiple electronic devices, sometimes referred to as a personal ecosystem. A user can be 'connected' (e.g., streaming music/videos, surfing the internet, messaging friends, reading emails, etc.) using multiple electronic devices in the ecosystem (e.g., wearable electronic device, phone, laptop, tablet, etc.). Typically, the user has to separately log-in to each of the multiple electronic devices in the ecosystem to use the devices, which can increase inconvenience for the user. Hence, there is a desire to improve the means for logging-in to multiple electronic devices in the ecosystem.

BRIEF DESCRIPTION OF THE DRAWINGS

Embodiments are illustrated by way of example and not by way of limitation in the FIGURES of the accompanying drawings, in which like references indicate similar elements and in which.

The FIGURES of the drawings are not necessarily drawn to scale, as their dimensions can be varied considerably without departing from the scope of the present disclosure.

DETAILED DESCRIPTION OF EMBODIMENTS

The following detailed description sets forth embodiments of apparatuses, methods, and systems relating to extending user authentication across a trust group of smart devices. Features such as structure(s), function(s), and/or characteristic(s), for example, may be described with reference to one embodiment as a matter of convenience; however, various embodiments may be implemented with any suitable one or more of the described features.

Figure 1:
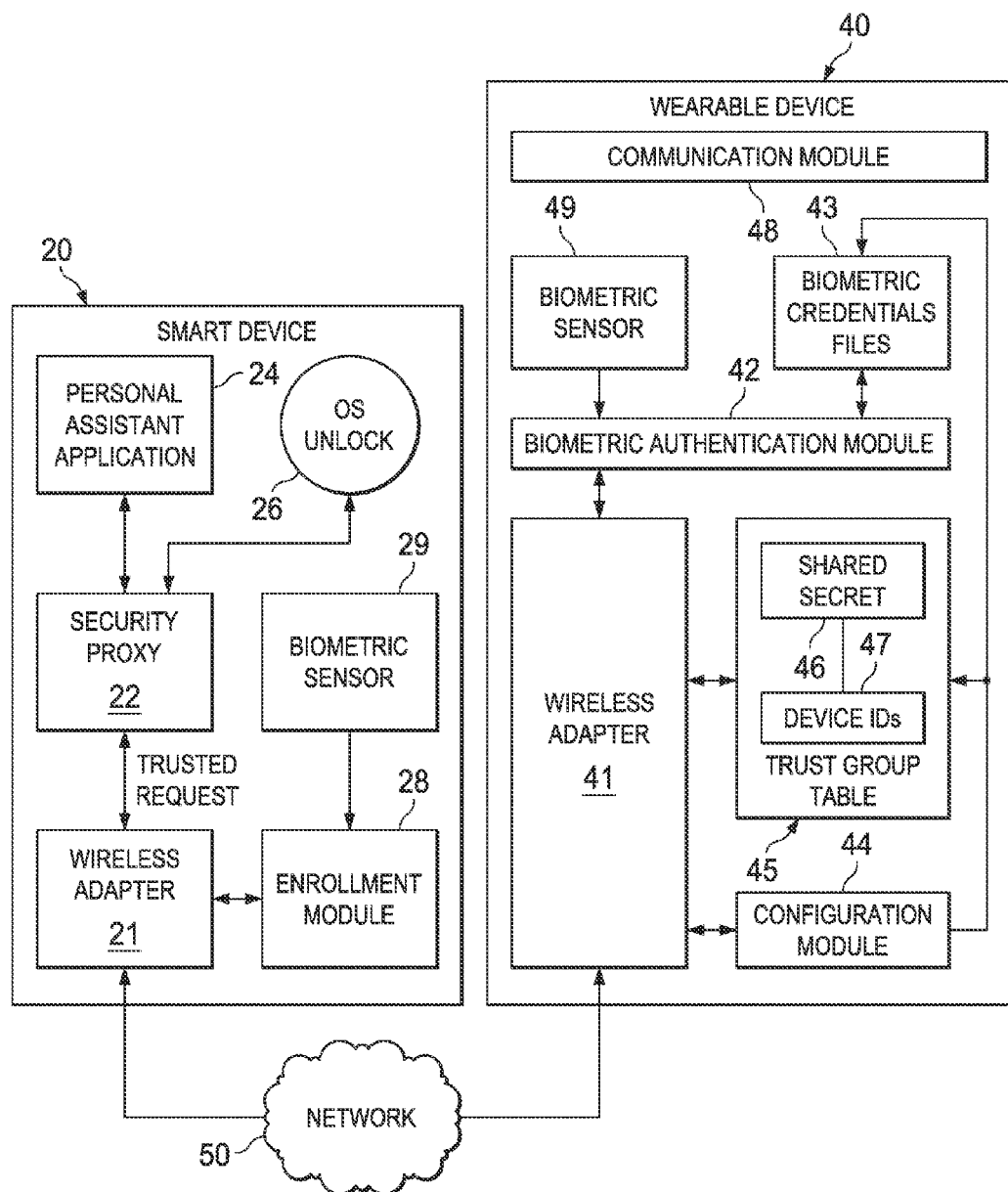
FIG. 1 is a simplified block diagram illustrating components associated with extending user authentication across smart devices in a trust group according to an embodiment of the present disclosure.

FIG. 1 is a simplified block diagram of example components associated with extending user authentication across smart devices in a trust group. A wearable device 40 communicates with a smart device 20 via a secure network 50, and respective wireless adapters 41 and 21. Wearable device 40 can include a biometric authentication module 42, a communication module 48, and a configuration module 44 for performing operations associated with extending user authentication in a trust group. Wearable device 40 can also store (or access over a network) biometric credential files 43 that include at least one biometric credential of an authorized user of wearable device 40 and smart device 20. A trust group table 45 is also stored in (or accessible over a network by) wearable device 40, and includes information uniquely identifying smart devices (possibly inclusive of other wearable devices) in the trust group. In one particular example, the information can include a mapping of a device identifier ("device ID") corresponding to smart device 20 to a shared secret associated with the wireless connection between wearable device 40 and smart device 20. Trust group table 45 can include similar mappings that are specific to each smart device in the trust group.

Smart device 20 can include an enrollment module 28 and a security proxy 22 for performing operations associated with extending user authentication across a trust group of smart devices. An operating system (OS) unlock 26 is enabled by security proxy 22 when authentication of a user is extended from wearable device 40 to smart device 20. A personal assistant application 24 is an example of an application that may be accessed by a user via wearable device 40 when authentication of the user is extended from wearable device 40 to smart device 20.

For purposes of illustrating certain example features a system in which user authentication is extended across smart devices in a trust group, it is important to understand the communications that may be traversing the network environment and the scenarios in which the device may be particularly beneficial. The following foundational information may be viewed as a basis from which the present disclosure may be properly explained.

A personal ecosystem is an emerging trend in which individual smart electronic devices interconnect to form a personal network of devices that provide various services to the owner (or user) of the devices. Smart electronic devices (also referred to herein as 'smart devices') are electronic devices, components, elements or objects capable of voice, audio, media, or data exchanges with other devices and/or networks via various protocols. Examples of smart devices can include, but are not limited to, mobile electronic devices, wearable electronic devices, smart appliances, embedded controllers, car infotainment systems, navigation systems, certain desktops and laptops, etc. Mobile electronic devices are intended to be inclusive of smart mobile phones (smartphones), tablets, phablets, laptops, ultrabooks, personal digital assistants (PDAs), portable navigation systems, multimedia gadgets (e.g., cameras, video and/or audio players, etc.) gaming systems, other handheld electronic devices, etc. Wearable electronic devices (also referred to herein as 'wearable devices') are intended to include any smart device capable of voice, audio, media, or data exchanges in a wireless network environment and which can be worn by a user, for example, by attachment to a body part or clothing of the user (e.g., a bracelet, a headset, a watch, eyeglasses, device with a clip, etc.).

Many users have accumulated multiple smart devices. If authentication is configured in any of the smart devices owned by a user, typically, the user logs into each of those devices separately in order to access information or services provided by the particular device. As wearable electronic devices proliferate, users are likely to accumulate multiple wearable electronic devices as well. Separate authentication requirements for each wearable device is likely to add to the user's burden of managing multiple authentications on multiple devices. This can become particularly burdensome as the user's cache of electronic devices continues to grow.

People have also become increasingly attached to their mobile electronic devices (also referred to herein as 'mobile devices'). People can be seen carrying and interacting with their mobile phones (and other mobile devices) during almost every aspect of their lives, including business, social, and personal times. Accessing multiple mobile devices and other smart devices within an ecosystem can be cumbersome and inconvenient, particularly when multiple authentications are required due to authentication requirements that are specific to particular devices. There is a desire to improve the ability of users to more easily access multiple smart devices within their ecosystem.

Some wearable electronic devices are designed to communicate with (e.g., to be paired with) one or more of a user's smart devices for certain uses. For example, a headset may be configured with wireless communication capabilities such as Bluetooth™, which enables audio communication between the headset and a mobile device or other smart electronic device. Generally, however, such headsets pass all audio to the mobile devices for processing, but do not perform any user/speaker authentication on the headset. Thus, such wearable devices do not alleviate the burden to users of multiple authentications on multiple devices.

A wearable electronic device as shown and described herein, overcomes many of these problems and provides a solution for users who desire secure, convenient access to multiple smart electronic devices. Particular embodiments described herein provide for a wearable electronic device (e.g., headset, electronic watch or bracelet, electronic eyeglasses, etc.) with a biometric authentication capability. The user of the wearable device enrolls his biometric characteristic (e.g., voice, fingerprint, eyes, facial features, hand features, pulse, etc.) on a primary smart device, such as a smartphone, to enable biometric authentication of the particular characteristic. For voice authentication, the user of the wearable device could also enroll a user defined voice trigger, which is a particular word or phrase that can be authenticated in addition to the voice itself. An enrollment module can generate at least one user specific biometric credential on the smart device based on biometric input from a user. The user specific biometric credentials can be transferred to the wearable device over a secure wireless or wired connection, and stored in a memory element of the wearable electronic device. In addition, information identifying the primary smart device is stored by the wearable device to indicate the primary smart device is part of a trust group with the wearable device. This identifying information can include, for example, an identifier of the smart device and security information that is associated with the secure wireless connection between the wearable device and the smart device.

When the user authenticates to the wearable device based on the user specific biometric credentials, the wearable device establishes a secure wireless connection to a smart device in the trust group that is currently accessible over a secure wireless connection. For ease of reference, the following description may refer to authentication of a user based on multiple biometric credentials. It will be understood, however, that the wearable device may be configured to allow a user to authenticate based on a single biometric credential or multiple biometric credentials. Furthermore, some embodiments of the wearable device may be configured to accept other types of authentication credentials (e.g., password, pass code, etc). When appropriate biometric credentials have been provided, the accessed smart device can unlock its operating system to allow the user to interact with the smart device, for example, via voice commands through the wearable device to a Personal Assistant (PA) application running on the smart device. The PA application may have access to secure applications and data on the smart device and thus, provide the user with access to such applications and data without the user physically manipulating or otherwise handling the smart device. Thus, the wearable electronic device can provide biometric authentication of the user to enable interaction with and/or control of other electronic devices within a trust group of the user's smart devices.

Turning again to FIG. 1, FIG. 1 illustrates a network environment to facilitate a system for extending user authentication from a wearable electronic device to smart devices in a trust group. Before discussing potential flows associated with the architecture of FIG. 1, a discussion is provided about some of the possible components and infrastructure that may be associated with the network environment and components shown in FIG. 1.

In one or more embodiments, wearable electronic device 40 and smart device 20 can be provisioned with respective wireless adapters 41 and 21. The wireless adapters can include wireless communication circuitry (e.g., Wi-Fi module, Bluetooth™ module, near field communication (NFC) module, or other wireless communication circuitry) to allow wearable electronic device 40 and smart device 20 to communicate with one another and potentially with other electronic devices or a network through a wireless connection. The wireless communications may be inclusive of wireless technologies (e.g., Institute of Electrical and Electronics Engineers (IEEE) Std 802.11™-2012, published Mar. 29, 2012, IEEE Std 802.16™-2012, published Aug. 17, 2012, WiFi, WiMax, Dedicated short Range Communications (DSRC), etc.), satellite, cellular technologies (e.g., 3G/4G/5G/nG, etc.), other radio frequencies (e.g., near field communications (NFC), radio frequency identification (RFID), etc.), and/or any other networking protocols that facilitate wireless communications in a network environment. In an embodiment, a plurality of antennas can be provisioned in conjunction with wearable electronic device 40 and/or smart device 20, which may be associated with wireless connection activities. In a particular embodiment, wearable device 10 can operate in a low power 'Always Listening' mode to facilitate wireless communications with other electronic devices.

In at least one embodiment, the wireless connection via network 50 may be a secure wireless personal area network (WPAN) to interconnect wearable device 40 to secure network 50, smart device 20, and possibly other electronic devices within a relatively small area (e.g., Bluetooth™, invisible infrared light, Wi-Fi, WiDi, etc.). In another embodiment, the wireless connection may be a secure wireless local area network (WLAN) that links wearable device 40 to secure network 50, smart device 20, and possibly other electronic devices over a relatively short distance using a wireless distribution method, usually providing a connection through an access point for Internet access. The use of spread-spectrum or OFDM technologies may allow wearable electronic device to move around within a local coverage area, and still remain connected to network 50, smart device 20, and possibly other electronic devices. In some embodiments, the wireless connection may also include any cellular wireless (e.g., 3G/4G/5G/nG, LTE, etc.), WiFi/WiMax, satellite, or other similar connection to network 50. In a particular embodiment, network 50 represents a Bluetooth™ secure wireless connection between wearable device 40 and smart device 20.

In at least some embodiments, such as a cloud based embodiment, network 50 may include a series of points or nodes of interconnected communication paths for receiving and transmitting packets of information that propagate through network 50. Network 50 can offer a communicative interface and may be any local area network (LAN), wireless local area network (WLAN), metropolitan area network (MAN), Intranet, Extranet, WAN (e.g., the Internet), virtual private network (VPN), or any other appropriate architecture or system that facilitates communications in a network environment. Network 50 may be inclusive of wire line technologies (e.g., Ethernet, T1 lines, etc.) and any wireless technologies previously discussed herein. Network 50 can comprise any number of hardware or software elements coupled to (and in communication with) each other through a communications medium.

Such configurations of network 50 may be particularly suited to a cloud based embodiment of the system in which the enrollment process includes pushing user specific biometric credentials to the cloud. Subsequently, any wearable device or other electronic device that is provisioned with biometric authentication capabilities and secure wireless capabilities, can be synced with the information in the cloud. Such information can include, but is not necessarily limited to, biometric credentials and possibly information identifying smart devices that form a trust group with wearable device 40.

A cloud is intended to refer to services (e.g., computing services, storage services) that are remotely accessible to electronic devices, such as wearable device 40 and smart device 20, through a WAN, such as the Internet, or other suitable network. A cloud may include any one or more network elements capable of hosting the cloud's services and linking smart device 20 and wearable device 40 to those services. As used herein, the term 'network element' is meant to encompass servers, routers, switches, gateways, bridges, loadbalancers, firewalls, inline service nodes, proxies, processors, modules, or any other suitable device, component, element, proprietary appliance, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information.

In at least one embodiment of the system for extending authentication across smart devices, smart device 20 may be a primary device or a secondary device. A primary device can be used by a user to enroll the user's biometric credentials to form a trust group with wearable device 40 and to enable authentication of the user by wearable device 40. The type of biometric credentials that are enrolled by a user depend upon the type of biometric authentication capability (e.g., type of biometric sensor and associated circuitry and logic) provisioned in smart device 20. A smart device can serve as a primary device when it is provisioned with a biometric authentication capability of the same type as a biometric authentication capability provisioned in wearable device 40. For example, if wearable device 40 is a headset and has a voice authentication capability, then smart device 20 can be a primary device if it also has a voice authentication capability. In another example, if wearable device 40 is a wrist wearable (e.g., bracelet, watch, etc.) and has a fingerprint authentication capability, then smart device 20 can be a primary device if it also has a fingerprint authentication capability.

Smart device 20 and its components and functionality will now be described when it serves as a primary device. Smart device 20 and wearable device 40 include respective biometric sensors 49 and 29 for sensing particular biological characteristics of a human user. As used herein, 'sensing' is intended to mean detecting, scanning, measuring, and/or recognizing the particular biological characteristics being sensed. Biometric technology can be used to sense and analyze human body characteristics such as, but not limited to, voice patterns, speech, fingerprints, eye retinas and/or irises, facial features, hand features, palm prints, and pulse features. A biometric sensor, such as 49 and 29, can be configured to sense a particular biometric characteristic of a user. For example, a fingerprint sensor can be used to sense a fingerprint, a microphone can be used to sense a voice (for both voice identification and speech recognition), an eye sensor can be used to sense eye retinas and/or irises, a facial sensor can be used to sense facial features, a hand sensor can be used to sense hand measurements/geometry and/or palm prints, and a pulse sensor can be used to sense pulse features.

In smart device 20, enrollment module 28, in conjunction with biometric sensor 29, enables a user to generate one or more biometric credentials and enroll his biometric characteristics with wearable device 40 to form a trust group. Enrollment module 28 may be configured to receive and process biometric input data indicative of user biometric input that was sensed by biometric sensor 29. User biometric input is the biometric characteristic (e.g., voice, fingerprint, eye, hand, pulse, etc.) provided by the user that is sensed by biometric sensor 29. Enrollment module 28 can generate a biometric credentials file that can be pushed to wearable device 40, or to a cloud in a cloud based implementation.

Security proxy 22 could be configured as part of the operating system of smart device 20 or could be installed separately. In at least one embodiment, security proxy 22 controls whether the operating system of smart device 20 is unlocked when wearable device 40 attempts to extend authentication of a user to the smart device. A smart device (or an operating system of a smart device) is referred to herein as being 'locked' when any applications, data, and/or other capabilities of the smart device cannot be accessed by a user unless appropriate authentication credentials (e.g., biometric credentials, password, pass code, personal identification number (PIN), etc.) are provided. In at least one embodiment, security proxy 22 can be configured to allow any suitable authorization, authentication, etc. (i.e., 'unlocking') to be executed between wearable device 40 and/or smart device 20 and/or security proxy 22 (or any other component). This can include any type of unlocking, releasing, exposing, opening, enabling, or otherwise granting access to one or more of the functions of wearable device 40 and/or smart device 20.

Smart device 20 may also be configured to receive appropriate authentication credentials from a user via a touch screen, a keyboard, or any other suitable input device. These authentication credentials could be the same or different than the authentication credentials used by wearable device 40 to authenticate a user. Alternatively, smart device 20 may be configured such that it does not require authentication credentials for a user to access its applications, data, and/or other capabilities via a touch screen, a keyboard, or any other suitable input device. In this scenario, however, wearable device 40 may still authenticate a user to enable the user to access smart device 20 via wearable device 40. Additionally, when the operating system of smart device 20 is locked (e.g., because appropriate authentication credentials have not been provided, because the operating system has been locked automatically due to inactivity, etc.), the smart device may still have other applications running and/or may be communicating with other devices and/or networks (e.g., receiving text messages, receiving emails, receiving phone calls, etc.), depending on its particular configuration.

Security proxy 22 may be configured to unlock the operating system of smart device 20, as indicated by OS unlock 26, when a trusted request is received from wearable device 40. In at least one embodiment, wearable device 40 sends trusted requests from the user to smart device 20 only after the user has been successfully authenticated. Thus, security proxy 22 does not receive any requests or other communications from wearable device 40 unless the request is trusted based on the successful biometric authentication of the user by the wearable device. The security proxy 22 may be configured to understand this authentication protocol used between smart device 20 and wearable device 40. Therefore, in this embodiment, security proxy 22 can accept any request received from wearable device 40 as a trusted request and can unlock the operating system whenever a request is received.

A request is a communication received from another device. A request could be a command sent to smart device 20 from wearable device 40 (e.g., command to enable voice recognition) or input data produced from user input on wearable device 40 that is capable of interacting with applications or services of smart device 20. A request could be produced from the same type of biometric input used in the authentication of the user (e.g., voice). Alternatively, the authentication of the user may be based on one type of biometric input, while requests made by the user to access smart device 20 could be based on another type of input. For example, a wearable electronic watch may have voice authentication capabilities to enable voice authentication of a user. If the watch also has a touch screen display, then after the user is authenticated, the watch may allow touch input from the user to communicate with a smart device to which it is connected.

In at least one other embodiment, security proxy 22 may be configured to unlock the operating system of smart device 20 after verifying a received request was sent by wearable device 40 and not some other device. In this embodiment, upon wakeup from receiving a request from another device, security proxy 22 can send a query to the operating system to identify the sending device of the request. If the request was sent by wearable device 40, then security proxy 22 can unlock the operating system. Otherwise, security proxy 22 may leave the operating system locked. In one embodiment in which Bluetooth is used to link smart device 20 with wearable device 40, and in which the user issues voice requests to wearable device 40 to access personal assistant application 24, security proxy 22 can query the operating system to determine the identity of the sending device when a particular AT command (e.g., AT+BVRA=1) to enable voice recognition on the smart phone is received. Based on a link key of the wireless connection and a device identifier of the sending device, security proxy 22 can determine whether the AT command was received from wearable device 40.

Once the operating system is unlocked by security proxy 22, if smart device 20 is provisioned with personal assistant application 24, then personal assistant application 24 can receive and respond to voice requests from wearable device 40 over the secure wireless connection. A personal assistant application is an example of an intelligent software agent that can perform tasks or services for a user based on user input and other information obtained by the personal assistant application (e.g., GPS location, information from online sources, such as weather, traffic, news, stock prices, users schedules, retail prices, etc.). Personal assistant applications are becoming more and more common on mobile phones, tables, and other smart devices. Personal assistant applications are often configured to respond to voice requests (e.g., commands, instructions, etc.) from a user. Accordingly, smart device 20 may be configured with a voice sensor (e.g., biometric sensor 29 or another sensor) and associated circuitry and logic to receive voice requests directly from a user to personal assistant application 24. However, once the a secure wireless connection is established between wearable device 40 and smart device 20, and the operating system is unlocked by security proxy 22, then personal assistant application 24 can respond to voice requests from a user via wearable device 40.

In other embodiments, an application on a smart device, other than a personal assistant application, may receive and respond to a trusted request from a wearable device. In some instances, these other applications may respond to touch input or other types of input from a user, instead of voice input. For example, wearable device 40 may have a touch screen display and, once the user is authenticated on wearable device 40 via the user's biometric credentials (e.g., voice, fingerprint, eye, hand, pulse, etc.), the user may then provide appropriate touch input to interact with the application on the smart device.

In some embodiments, a communication sent to security proxy 22 by wearable device 40 includes an authentication result indicating whether biometric input data from a user was successfully authenticated (passed) or not successfully authenticated (failed). In at least one embodiment, security proxy 22 could allow selective access to applications and services by implementing various levels of security based on the authentication result. To implement multiple levels of security, security proxy 22 could determine which applications/services to allow the user to access and/or which applications/services to block the user from accessing, based on the authentication result. For example, when the authentication result indicates 'passed' (i.e., user successfully authenticates to the wearable device), security proxy 22 could be configured to allow unrestricted access to any application or service requested by the user. When the authentication result indicates 'failed' (i.e., user does not successfully authenticate to the wearable device), then smart device 20 could be configured to allow the user to access common services or applications that do not involve confidential or personal information. Examples of such common services or applications could potentially be weather queries, stock price updates, informational Internet queries, etc.

A secondary smart device is a smart device that joins a trust group already formed by wearable device 40 and a primary smart device. A secondary smart device may have at least some of the same components as a primary smart device, such as smart device 20. For example, a secondary smart device includes a wireless adapter, a security proxy, and an enrollment module. The secondary smart device may or may not include a biometric sensor. A biometric sensor is not needed for the secondary smart device to join a trust group, because the existence of the trust group indicates that a user has already enrolled the user's biometric characteristics and provided biometric credentials to the wearable device via a primary smart device. If a secondary smart device includes a personal assistant application, then the user can interact with the secondary smart device if the wearable device is voice-enabled to receive voice requests from the user. A secondary smart device also includes an enrollment module, but it may function somewhat differently than an enrollment module on a primary smart device. The enrollment module on a secondary smart device may be launched when a user wishes to add the secondary device to the trust group of a wearable device. The enrollment module establishes a wireless connection to the wearable device and sends a query to determine whether it is already part of the trust group and what type of capabilities are provided by the wearable device. If the secondary smart device is not already part of the trust group, and if the wearable device's capabilities indicate it can extend authentication over a wireless connection, then the secondary smart device can send a request to the wearable device to join the trust group.

In wearable device 40, biometric credential files 43 can include biometric credentials pushed to wearable device 40 by a primary smart device (e.g., smart device 20). The biometric credentials include biometric information indicative of biometric input from a user that is captured by the primary smart device when a user enrolls in the system. The biometric information can include data representing user-specific attributes of the particular biometric characteristic. Generally, each user has unique biometric information for the particular type of biometric characteristic being used for authentication (e.g., unique voice patterns, unique fingerprint, unique eye measurements, unique hand features, unique pulse features, etc.). The user specific biometric credentials can then be compared to received biometric input data indicative of biometric input captured by wearable device 40. In some embodiments, biometric credentials could be pushed to a cloud by the primary smart device and then retrieved by wearable device 40 for local storage or each time biometric input is captured.

In wearable device 40, biometric sensor 49, in conjunction with biometric authentication module 42 and biometric credential files 43, enable a user to provide biometric input (e.g., voice input, fingerprint input, eye input, hand input, pulse input, etc.), and to be authenticated and allowed to access other smart devices in a trust group. Biometric input may be converted to another form (e.g., analog signals converted to digital data) to produce biometric input data, which can be processed by biometric authentication module 42. Generally, biometric authentication module 42 can attempt to authenticate the biometric input data by comparing it with biometric credentials in biometric credential files 43. If the biometric input data corresponds to the biometric credentials, then the biometric input data (and user) is successfully authenticated. If the biometric input data does not correspond to the biometric credentials, then the biometric input data (and user) is not successfully authenticated.

In an embodiment configured with voice sensors for voice authentication, biometric authentication module 28 can provide both voice recognition operations and speech recognition operations. For example, voice recognition credentials can be used to verify that a speaker is actually the authorized user, while the speech recognition credentials can be used to verify that the speaker's words included an expected voice trigger (i.e., a particular word or phrase indicating a command to access another device through the wearable device). In this embodiment, an authorized user cannot be authenticated for purposes of extending authentication to other devices unless the authorized user provides the particular voice trigger. By way of illustration, a voice trigger could be, "Hello smart device." If the user is successfully authenticated, biometric authentication module 42 can provide appropriate commands (e.g., AT+BVRA=1 for Bluetooth) to enable voice recognition on smart device 20.

Trust group table 45 can be provided in wearable device 40 to store information uniquely identifying smart devices in a trust group associated with wearable device 40. In one example, trust group table 45 can include a device identifier ("device ID") of each smart device in the trust group. Any information that uniquely identifies a smart device can be used as a device ID, or can be mapped to a device ID, or can be configured in any other possible manner to distinguish smart devices in the trust group from one another. In one possible implementation, a device ID can be an index to another table that contains uniquely identifying information for each smart device in the trust group. In one possible implementation, each device ID can be mapped to a different shared secret (or other connection-specific security information) associated with a secure wireless connection between wearable device 40 and the smart device corresponding to that device ID. For example, a particular shared secret may be used to secure a wireless connection between wearable device 40 and smart device 20, which corresponds to a device ID mapped to the particular shared secret. The particular shared secret may be used to encrypt communications sent over the wireless connection between wearable device 40 and smart device 20. When Bluetooth is used to establish the wireless connections between wearable device 40 and smart devices in the trust group, a shared secret is typically referred to as a 'link key'. It will be readily apparent that other types of uniquely identifying information (e.g., Media Access Control (MAC), etc.) may be used instead of a shared secret or link key. The use of these other types of uniquely identifying information, and the particular manner of implementing a trust group table with the uniquely identifying information, may be based on particular needs and implementation criteria of wearable device 10.

In at least some embodiments, device IDs can be mapped to wireless connection security information (e.g., shared secret, link key, etc.), or other uniquely identifying information of the smart devices in the trust group, using any suitable mapping, marking, or linking technique (e.g., lists, tables, associative arrays, pointers, indexes, graphs, linked lists, file names, relational databases, hash table, etc.), or any other technique or mechanism that represents a relation, connection, or link between the device IDs and security information. For example, a simple table configuration or indexed table configuration, which is generally a data structure used to organize electronic information, is one possible way to implement trust group table 45, as previously described. It will be appreciated, however, that trust group table 45 could be modeled in various other ways, and these other configurations could be based on the particular preferences and needs of a given implementation.

Configuration module 44 may be provided in wearable device 40 to configure enrollment data (biometric credentials) such as a voice data for voice-enabled authentication or fingerprint data for fingerprint-enabled authentication. These biometric credentials may be received from smart device 20, or from the cloud in a cloud based embodiment. Configuration module 44 can also set the trust relationship between wearable device 40 and other smart devices in the trust group, such as smart device 20. For example, configuration module 44 may provide the mapping of device identifiers to shared secrets in trust group table 45. Configuration module 44 may also turn on the biometric authentication of wearable device 40 and configure wearable device 40 to wake up (or not to wake up) if the biometric authentication is unsuccessful. Configuration related actions may be based on user input that is provided on the primary smart device (e.g., via enrollment module 28) and pushed to wearable device 40. Wearable device 40 may also include communication module 48 for controlling proprietary communications with enrollment module 28.

Figure 2:
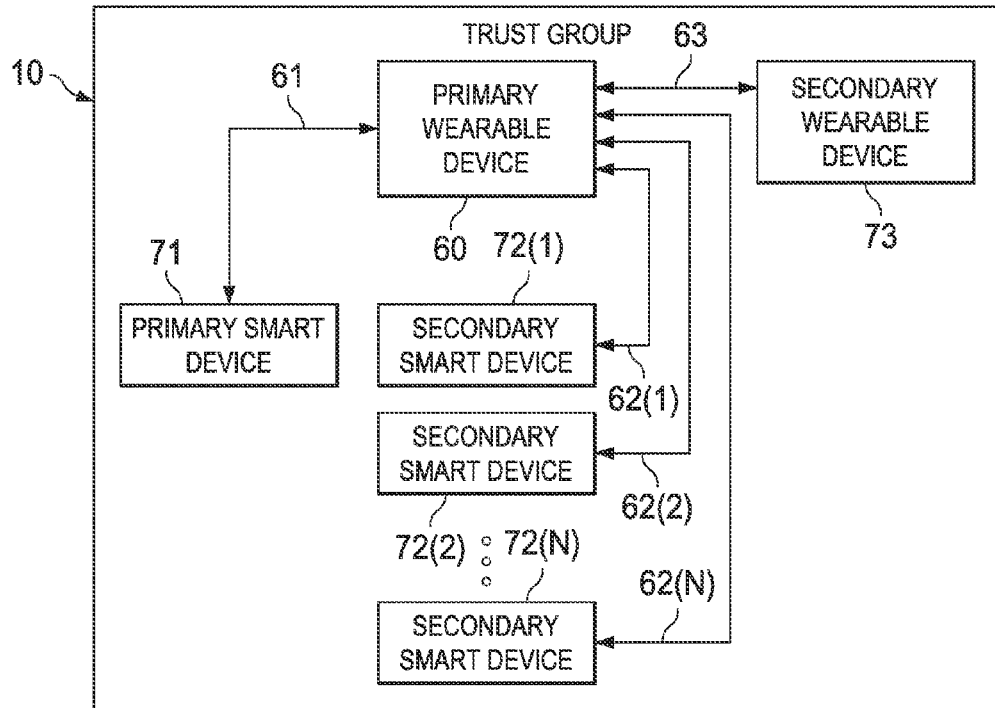
FIG. 2 is a simplified block diagram illustrating an example trust group, according to an embodiment of the present disclosure.

FIG. 2 is a simplified block diagram illustrating an example of a trust group 10. Trust group 10 can be initially formed with a primary wearable device 60 and a primary smart device 70. Other smart devices and/or wearable devices may (or may not) then be added to trust group 10. For illustrative purposes, trust group 10 is shown with multiple secondary smart devices 72(1)-72(N) and a secondary wearable device 73. Once trust group 10 is formed with the two primary devices, however, any number of secondary smart devices and/or any number of secondary wearable devices, could be added to the group.

In order to form trust group 10, biometric credentials of a user are enrolled on primary smart device 70 and securely transferred to primary wearable device 60. In addition, the devices have to be capable of establishing a secure wireless connection 61 between them. If a secure wireless connection can be established, then information identifying primary smart device 70 can be stored by primary wearable device 60 to indicate primary smart device 70 is part of trust group 10. This information can include, for example, an identifier of primary smart device 70 and security information associated with secure wireless connection 61.

In at least one embodiment, wireless connection 61 can be established in a secure way using Bluetooth, which is a wireless technology standard for short-range radio frequency band wireless interconnection of electronic devices. The standard is managed by Bluetooth® Special Interest Group, which adopted Bluetooth Specification Version 4.0 (June 2010), along with subsequent addendums.

Using Bluetooth, a secure wireless connection can be established by first 'pairing' two electronic devices. In the pairing process, the first and second devices being paired establish a relationship by creating a shared secret, also referred to as a 'link key'. When the link key is stored by both devices, they are said to be 'paired' or 'bonded'. A secure wireless connection can be established by the first device to the second device (or vice versa) by cryptographically authenticating the identity of the second device to ensure it is the correct device to which the first device was originally paired. In addition, communications between the devices may be encrypted using the link key to prevent eavesdropping or misappropriation of data being exchanged between the devices.

The user can transfer his biometric credentials from primary smart device 70 to primary wearable device 60 via secure wireless connection 61, or via any other secure connection to primary wearable device 60. Generally, the user can transfer his biometric credentials to any other electronic device enabled with the biometric identification capabilities for the same biometric characteristics (e.g., voice, fingerprint, eye, hand, pulse, etc.) as the user's biometric credentials. This transfer can be accomplished via a secure wireless connection (e.g., Bluetooth) or other secure wireless or wired channels. In at least one embodiment, the biometric credential file transfer can be cloud based. In this embodiment, the biometric credentials are transferred to the cloud and then transferred to primary wearable device 60, and possibly to other electronic devices enabled with the same biometric identification capabilities. Thus, it is possible for a primary smart device (and secondary smart devices) to be included in multiple trust groups.

Primary wearable device 60 can add secondary smart devices 72(1)-72(N) to trust group 10 by establishing a separate and secure wireless connection between primary wearable device 60 and each secondary smart device 72(1), 72(2), through 72(N). In at least one embodiment, Bluetooth can be used to securely pair each secondary smart device 72(1)-72(N), respectively, to primary wearable device 60. Secure wireless connections 62(1), 62(2), through 62(N) can be established using the security protocols (e.g., link keys) generated during the pairing processes. When the secure wireless connections 62(1)-62(N) can be established, then information identifying secondary smart devices 72(1)-72(N) can be stored by primary wearable device 60 to indicate secondary smart devices 72(1)-72(N) are part of trust group 10.

A primary wearable device in a trust group can also add one or more other wearable devices to the trust group. As shown in FIG. 2, primary wearable device 60 adds secondary wearable device 73 to trust group 10 by establishing a secure wireless connection 63 between primary wearable device 60 and secondary wearable device 73. In at least one embodiment, Bluetooth can be used to securely pair secondary wearable device 73 to primary wearable device 60. Secure wireless connection 63 can be established using the security protocols (e.g., link key) generated during the pairing process. When secure wireless connection 63 can be established, information identifying secondary wearable device 73 can be stored by primary wearable device 60 to indicate secondary wearable device 73 is part of trust group 10.

Adding a secondary wearable device to a trust group can enable advanced use-cases, depending on the particular types of wearable and smart devices being used. In at least some advanced use-cases, a primary wearable device can act as a proxy or a peer to other wearable devices in the trust group. For example, one possible advanced use-case involves a split audio-visual model when primary wearable device 60 is a headset including audio but no visual, and secondary wearable device 73 includes a display screen (e.g., a wrist wearable such as a smart watch, etc.). In this scenario, the video can be displayed in the display screen of secondary wearable device 73, while the corresponding audio can be heard through primary wearable device 60. Another possible advanced use-case includes stereo music capability in which two physically separate mono-headsets work in conjunction to provide stereo music to the user.

After a user's biometric credentials are stored in, or otherwise available to, primary wearable device 60, and primary smart device 70 has been added to trust group 10, the user can access primary smart device 70 via primary wearable device 60. This access is enabled when primary wearable device 60 authenticates the user with the user's biometric credentials and extends the authentication to primary smart device 70. Subsequently, as each secondary smart device or secondary wearable device joins trust group 10, the user can access those devices via primary wearable device 60 as well. This access is enabled when primary wearable device 60 authenticates the user with the user's biometric credentials and extends the authentication to the particular secondary smart device 72(1)-72(N) or secondary wearable device 73. When authentication is extended to a primary or secondary device, the user can issue commands or requests to the particular primary or secondary device to which the primary wearable device is currently connected.

Furthermore, a biometric authentication mechanism used in a trust group is based on the particular biometric identification capabilities of primary wearable device 60 and primary smart device 71. In one example, if primary wearable device 60 is voice-enabled and primary smart device 71 enrolls the user's voice characteristics, then the user can authenticate to voice-enabled primary wearable device 60 (e.g., headset, voice-enabled watch, etc.) by speaking into its microphone. In at least some embodiments, the user may also need to provide a voice trigger (e.g., designated word or phrase needed to authenticate a user and connect to another device in the trust group). In another example, if primary wearable device 60 is fingerprint-enabled and primary smart device 71 enrolls the user's fingerprint characteristics, then the user can authenticate to fingerprint-enabled primary wearable device 60 (e.g., fingerprint-enabled watch, etc.) by providing one or more of his fingerprints to a fingerprint sensor area of a display screen. These are illustrative examples of how different biometric capabilities may be used in a trust group, and are not intended to be limiting. In fact, a trust group can be formed using any voice-enabled wearable device (e.g., headset, voice-enabled watch), fingerprint-enabled wearable device (e.g., fingerprint-enabled watch, etc.), or any wearable device having other biometric identification capabilities (e.g., eyes, hands, pulse, etc.).

In one example, if the biometric authentication mechanism uses voice and/or speech authentication, the user can authenticate to a voice-enabled primary wearable device (e.g., headset, voice-enabled watch, etc.) by speaking into its microphone. In at least some embodiments, the user may also need to provide a voice trigger (e.g., designated word or phrase needed to authenticate a user and connect to another device in the trust group). In another example, if the biometric authentication mechanism is fingerprint authentication, the user can authenticate to a fingerprint-enabled primary wearable device (e.g., fingerprint-enabled watch, etc.) by providing one or more of his fingerprints to a fingerprint sensor area of a display screen. Thus, a trust group can be formed using any voice-enabled wearable device (e.g., headset, voice-enabled watch), fingerprint-enabled wearable device (e.g., fingerprint-enabled watch, etc.), or other wearable device having other biometric identification capabilities (e.g., eyes, hands, pulse, etc.).

Figure 3A:
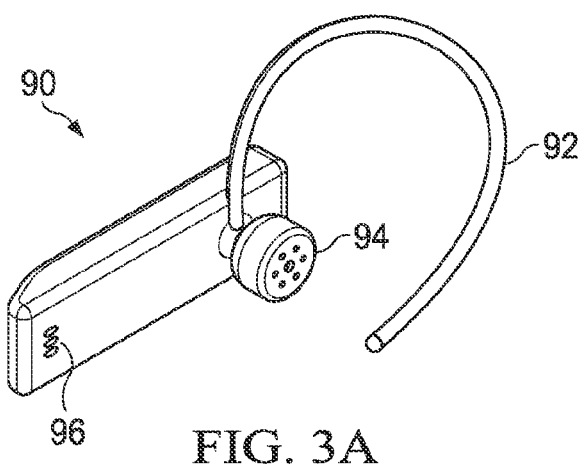
FIG. 3A is a simplified orthographic view illustrating an example wireless headset, according to an embodiment of the present disclosure.
Figure 3B:
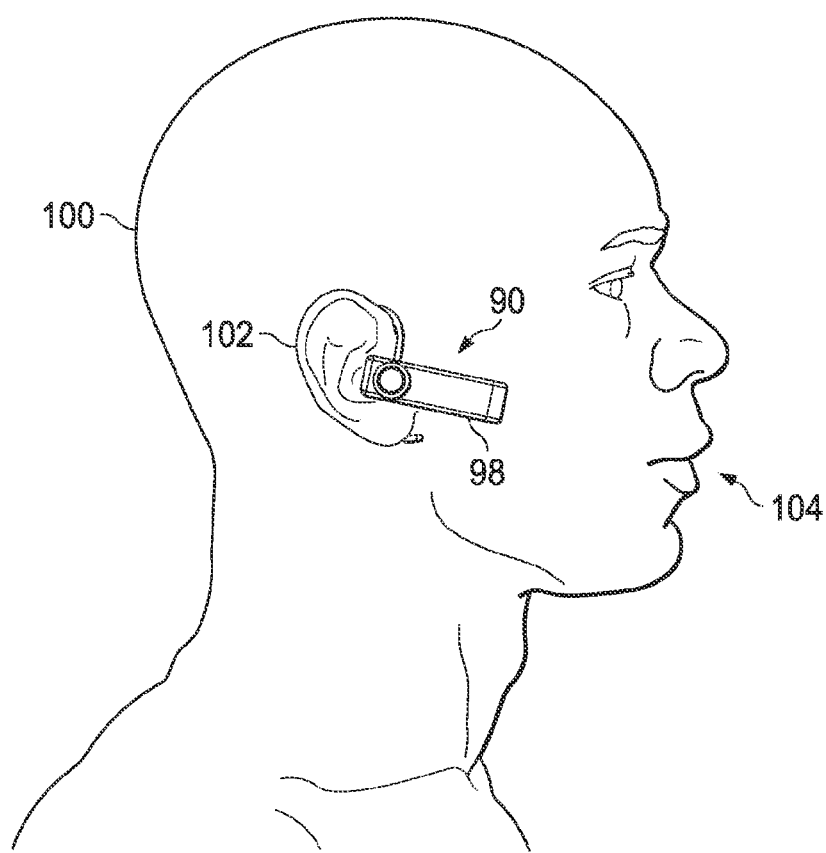
FIG. 3B is a simplified orthographic view illustrating an example wireless headset being worn by a user, according to an embodiment of the present disclosure.

Turning to FIGS. 3A and 3B, a simplified orthographic view of an example wearable device 90 is shown in accordance with at least one embodiment of the present disclosure. Wearable device 90 is a headset that comprises an ear loop 92, an earpiece 94, and a microphone 96 disposed in an extension piece 98. In one or more embodiments, the components of wearable electronic device 90 (e.g., ear loop 92, earpiece 94, microphone 96, extension piece 98, etc.) may be made of one or more materials including metal and metal alloys (e.g., stainless steel, aluminum, tin, iron, gold, silver, platinum, titanium, etc.), synthetic polymers (plastic, rubber, elastic, carbon fiber, injection molding), combinations thereof or the like. Wearable device 90 could be manufactured in various sizes to accommodate being worn by a variety of users of different body proportions (e.g., outer ear dimensions, jaw dimensions, ear channel dimensions, etc.). Alternatively, certain portions of wearable device 90 (e.g., ear loop 92, microphone 96, extension piece 98) could be manufactured in one size, with an adjustable earpiece 94 to accommodate being worn by a variety of users having different outer ear and ear channel dimensions.

Although wearable device 90 is shown as a single ear device, it will be apparent that numerous other designs could be used, including for example, a headband type headset with dual earpieces or a neck band type headset with dual earpieces. Generally, any configuration enabling one or both of the user's ears to receive sound waves produced from wireless signals received by wearable electronic device 90, and enabling the user to send voice communications using microphone 96. Microphone 96 could be disposed near a distal end of extension piece 98, as shown in FIG. 3A. In other configurations, microphone 96 could be disposed near a proximal end of extension piece 98, with a voicetube carrying sound to the microphone from the distal end of extension piece 98.

Wearable device 90 can include a circuit board coupled to a plurality of electronic components, which include any type of components, elements, circuitry, etc. Microphone 96 is a voice sensor that converts sound waves into electrical signals. Microphone 96 may include a diaphragm that vibrates when struck by sound waves, which causes other components in microphone 96 to vibrate. These vibrations can be converted into electrical current, which becomes an audio signal. An audio signal can be converted from analog to digital data, which is one example form of 'input data' that indicates biometric input from a user.

FIG. 3B is a simplified orthographic view showing a user 100 wearing wearable electronic device 90. Ear loop 92 is secured around the outside of an ear 102 of user 100. This position allows earpiece 94 to rest in the outer ear at the entrance to the ear canal of ear 102. This position also allows extension piece 98 to be positioned along a cheek of the user from earpiece 94 toward a mouth 104 of the user, where voice sound waves originate.

Figure 4:
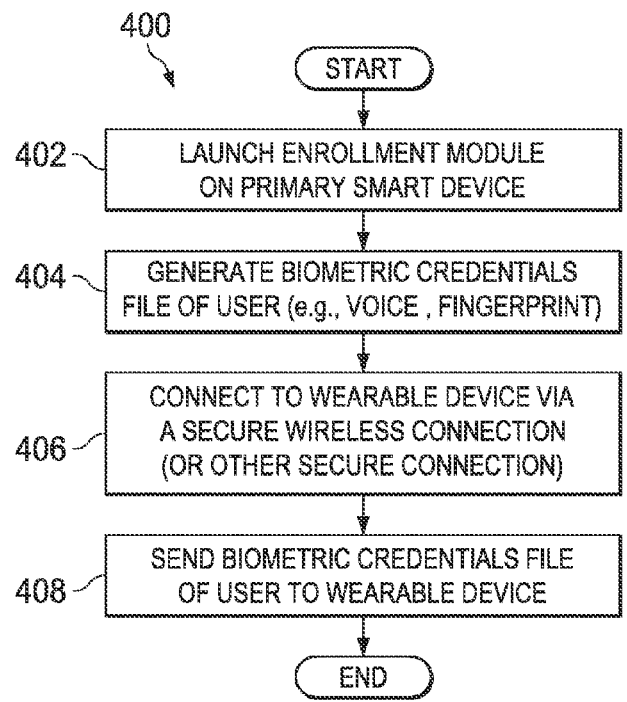
FIG. 4 is a simplified flow diagram illustrating activities associated with extending user authentication according to an embodiment of the present disclosure.

Turning to FIG. 4, FIG. 4 is a flowchart of a possible flow 400 illustrating activities that may be associated with embodiments described herein. In at least one embodiment, logic in the form of one or more sets of operations correspond to activities of FIG. 4. In an example, a smart device, such as smart device 20 of FIG. 1, may perform one or more operations of the sets of operations. This smart device may comprise means, including for example, one or more processors (e.g., further described herein at least with reference to processor 1000 of FIG. 10), for performing such operations. In at least one embodiment, enrollment module 28 is configured to perform, when executed by one or more processors, one or more operations of the sets of operations.

Flow 400 may begin at 402 where a primary enrollment module on a primary smart device is launched. The enrollment module may provide a user interface instructing a user how to provide the particular biometric input (e.g., voice, fingerprint, eye, facial, hand, etc.) required to enroll with a wearable device. Once the user has provided the appropriate biometric input, at 404, the enrollment module may generate a biometric credentials file with biometric credentials of the user. At 406, the primary smart device establishes a secure connection to the wearable device. The secure connection could be a secure wireless connection (e.g., Bluetooth) previously configured between the primary smart device and the wearable device. However, any other secure wired or wireless connection could be used to send the biometric credentials file at 408, to the wearable device. In other embodiments, the biometric credentials file may be sent to the cloud in a cloud based implementation. In this scenario, the wearable device receives the biometric credentials file from the cloud.

Figure 5:
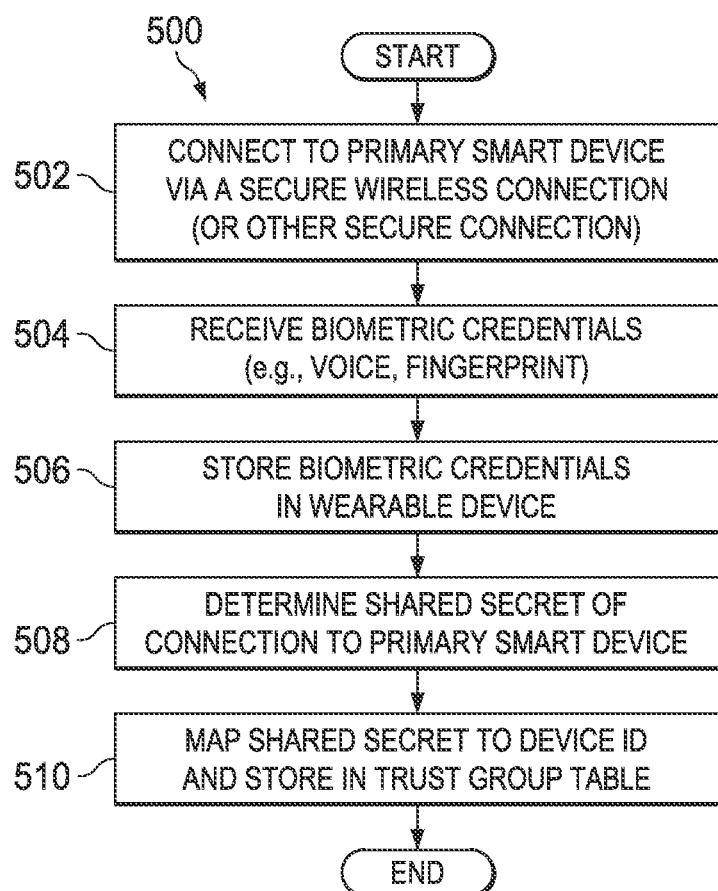
FIG. 5 is a simplified flow diagram illustrating activities associated with extending user authentication according to an embodiment of the present disclosure.

Turning to FIG. 5, FIG. 5 is a flowchart of a possible flow 500 illustrating activities that may be associated with embodiments described herein. In at least one embodiment, logic in the form of one or more sets of operations correspond to activities of FIG. 5. In an example, a wearable device, such as wearable device 40 of FIG. 1, may perform one or more operations of the sets of operations. This wearable device may comprise means, including for example, one or more processors (e.g., further described herein at least with reference to processor 1000 of FIG. 10), for performing such operations. In at least one embodiment, configuration module 44 is configured to perform, when executed by one or more processors, one or more operations of the sets of operations when a primary smart device enrolls a user's biometric credentials and forms a trust group with wearable device 40.

Flow 500 may begin at 500 where the wearable device establishes a secure wireless connection (or other secure connection) to a primary smart device. In at least one embodiment, this connection may be initiated by the primary smart device after the biometric credentials file has been generated. After the secure connection is established, at 504, the wearable device receives the biometric credentials file from the primary smart device. At 506, the biometric credentials file may be stored in the wearable device (e.g., biometric credentials file 43).

At 508, uniquely identifying information for the primary smart device is determined. In this example, wireless connection security information associated with a secure wireless connection configured between the wearable device and the primary smart device is determined. In at least one embodiment, the wireless connection security information includes a shared secret of the secure wireless connection. In a Bluetooth™ wireless connection, for example, the shared secret is a link key that was determined when the devices were paired. At 510, the shared secret can be mapped to a device identifier and stored in trust group table 45. A trust group is formed between the wearable device and the primary smart device when biometric credentials are enrolled with the wearable device from the primary smart device (as indicated at 504 and 506) and trust group table 45 is updated with information that uniquely identifies the primary smart device.

Figure 6:
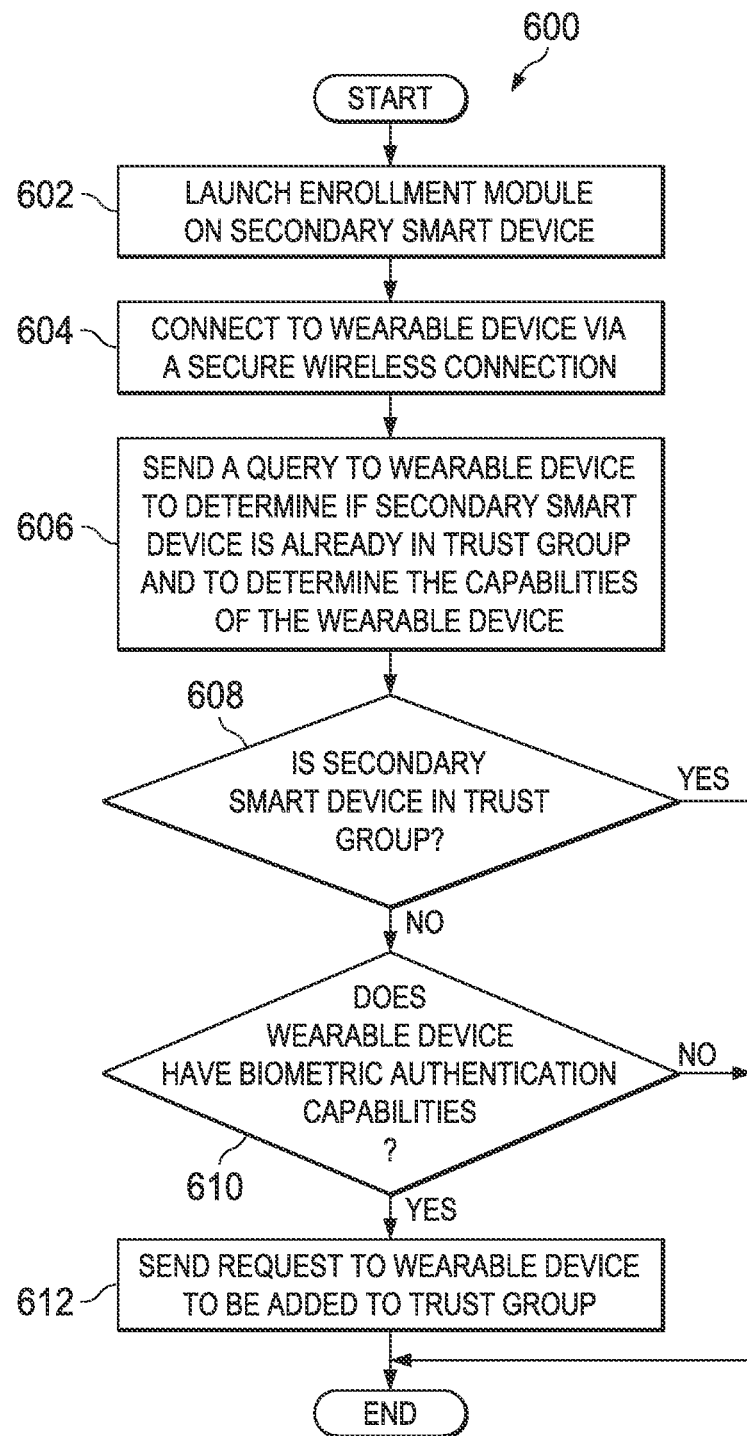
FIG. 6 is a simplified flow diagram illustrating activities associated with extending user authentication according to an embodiment of the present disclosure.

Turning to FIG. 6, FIG. 6 is a flowchart of a possible flow 600 illustrating activities that may be associated with embodiments described herein. In at least one embodiment, logic in the form of one or more sets of operations correspond to activities of FIG. 6. In an example, a secondary smart device, which could be configured similarly to smart device 20 of FIG. 1, as previously described herein, may perform one or more operations of the sets of operations. This secondary smart device may comprise means, including for example, one or more processors (e.g., further described herein at least with reference to processor 1000 of FIG. 10), for performing such operations. In at least one embodiment, an enrollment module for a secondary smart device is configured to perform, when executed by one or more processors, one or more operations of the sets of operations.

Flow 600 may begin at 602 where an enrollment module on a secondary smart device is launched. The secondary smart device establishes a secure wireless connection to a wearable device at 604. Once the secure wireless connection is established, at 606, the secondary smart device can send a query to the wearable device to determine whether the secondary smart device has already joined the trust group. In addition, in the same or different query, the secondary smart device also queries the wearable device to determine its capabilities (e.g., voice-enabled authentication, fingerprint-enabled authentication, whether it has been provisioned with biometric credentials of the user and has formed a trust group, etc.). If a response from the wearable device confirms that the secondary smart device has already joined the trust group, as determined at 608, then flow 600 may end. If a response from the wearable device indicates that the secondary smart device is not a current member of the trust group, then at 610, a determination may be made as to whether the same response (or a different response) indicates the wearable device has biometric authentication capabilities, whether it is provisioned with biometric credentials from a primary smart device, and whether a trust group has been formed. If the wearable device does not have biometric authentication capabilities, or if biometric credentials have not been provisioned or a trust group has not been formed, then flow 600 may end. However, if the wearable device does have biometric authentication capabilities, and if biometric credentials have been provisioned and a trust group has been formed, then at 612, the secondary smart device can send a request to the wearable device to be added to the trust group.

Figure 7:
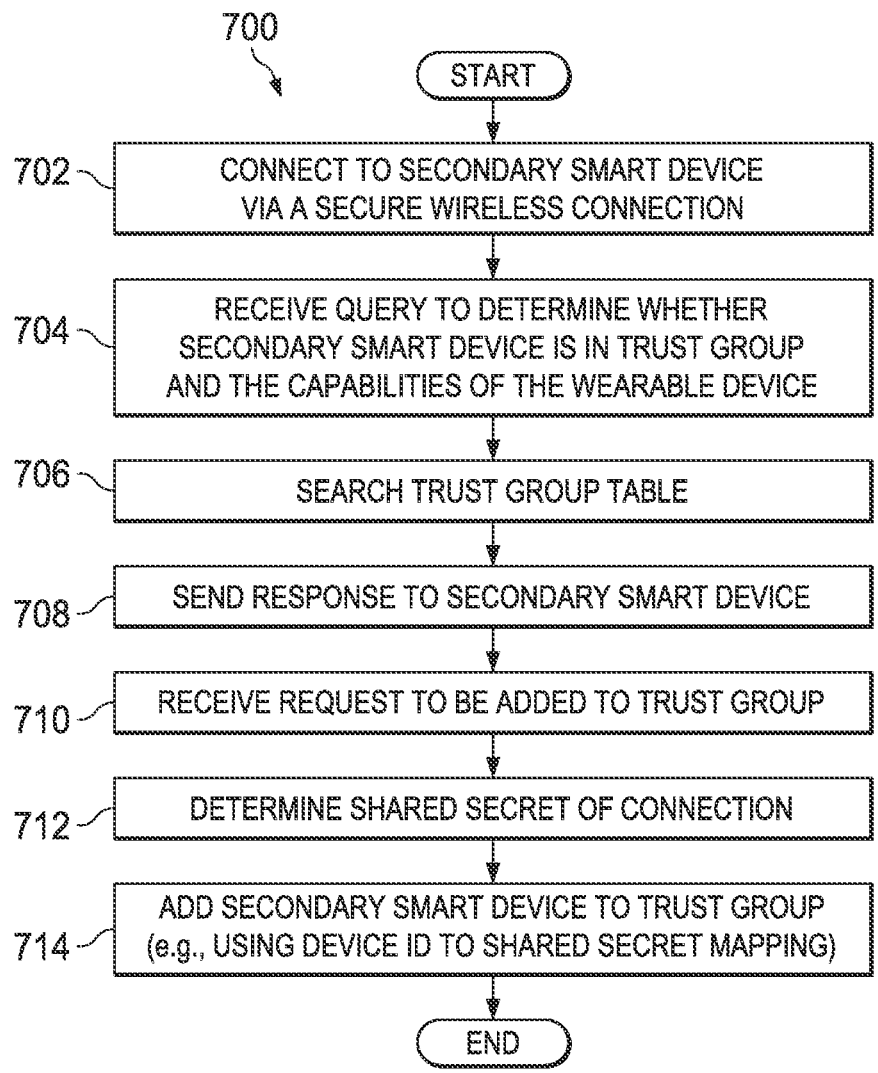
FIG. 7 is a simplified flow diagram illustrating activities associated with extending user authentication according to an embodiment of the present disclosure.

Turning to FIG. 7, FIG. 7 is a flowchart of a possible flow 700 illustrating activities that may be associated with embodiments described herein. In at least one embodiment, logic in the form of one or more sets of operations correspond to activities of FIG. 7. In an example, a wearable device, such as wearable device 40 of FIG. 1, may perform one or more operations of the sets of operations. This wearable device may comprise means, including for example, one or more processors (e.g., further described herein at least with reference to processor 1000 of FIG. 10), for performing such operations. In at least one embodiment, configuration module 44 is configured to perform, when executed by one or more processors, one or more operations of the sets of operations when a secondary smart device requests admission into the trust group.

Flow 700 may begin at 702 where the wearable device establishes a secure wireless connection to the secondary smart device. In at least one embodiment, this connection may be initiated by the secondary smart device after the enrollment module on the secondary smart device is launched. After the secure connection is established, at 704, the wearable device may receive a query from the secondary smart device to determine whether the secondary smart device has already joined the trust group. In addition, in the same or different query, the secondary smart device also queries the wearable device to determine its capabilities (e.g., voice-enabled authentication, fingerprint-enabled authentication, whether it has been provisioned with biometric credentials of the user and has formed a trust group, etc.). At 706, the wearable device can search trust group table 45 for the device identifier corresponding to the secondary smart device. If the device identifier is found, then the secondary smart device is part of the trust group. Otherwise, the secondary smart device is not part of the trust group. At 708, the wearable device can send a response to the secondary smart device indicating whether it is a member of the trust group. In addition, the wearable device can provide information to the secondary smart device as to its capabilities, and whether it is already configured with biometric credentials and has formed a trust group.

If the secondary smart device was determined not to be part of a trust group that was formed by the wearable device and at least one other smart device, then the wearable device may receive, at 710, a request to add the secondary smart device to the trust group. At 712, the wearable device can determine the shared secret (e.g., link key for Bluetooth connections), or other uniquely identifying information of the smart device, and at 714, can map a device identifier corresponding to the secondary smart device to the shared secret in trust group table 45.

Figure 8:
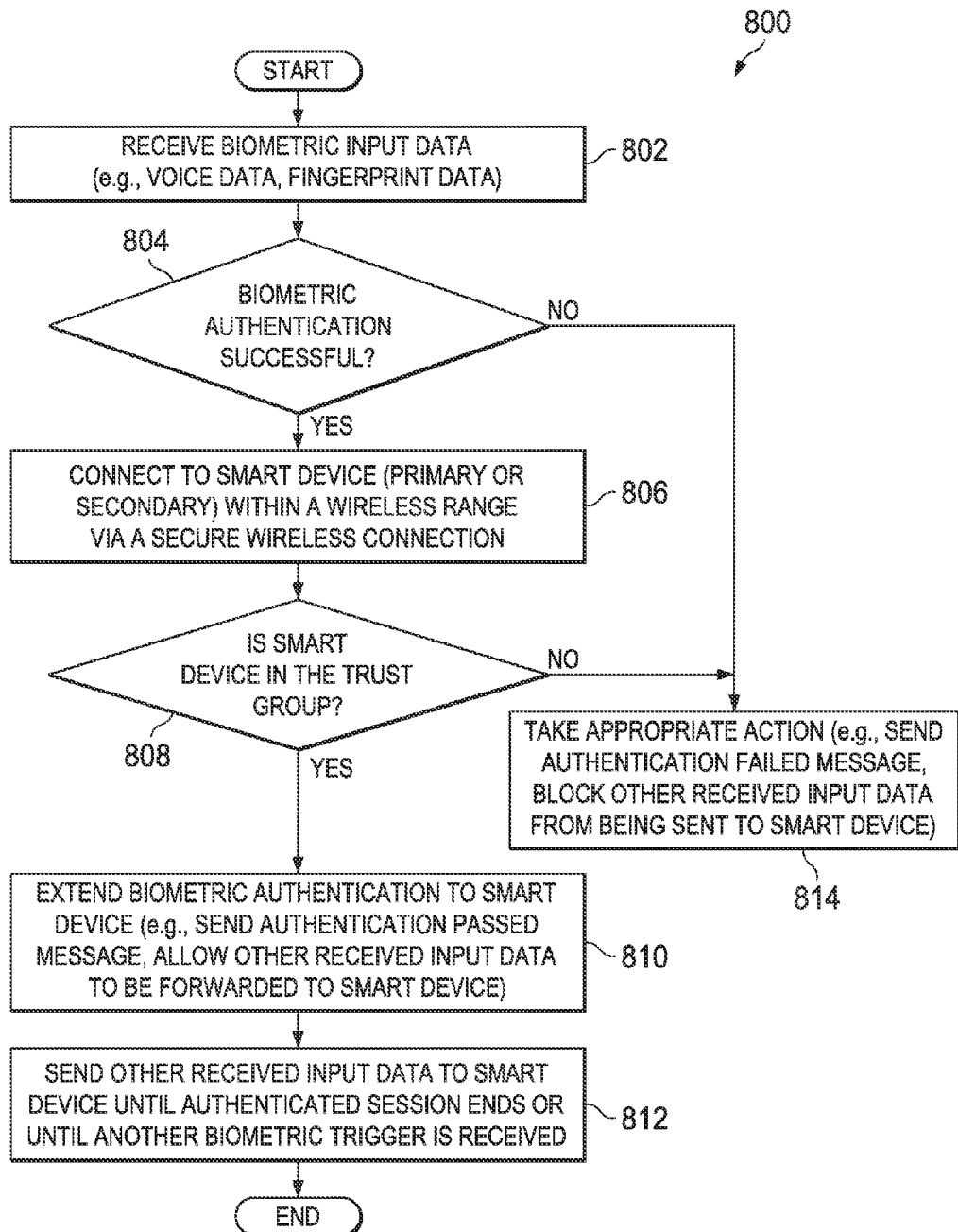
FIG. 8 is a simplified flow diagram illustrating activities associated with extending user authentication according to an embodiment of the present disclosure.

Turning to FIG. 8, FIG. 8 is a flowchart of a possible flow 800 illustrating activities that may be associated with embodiments described herein. In at least one embodiment, logic in the form of one or more sets of operations correspond to activities of FIG. 8. In an example, a wearable device, such as wearable device 40 of FIG. 1, may perform one or more operations of the sets of operations. This wearable device may comprise means, including for example, one or more processors (e.g., further described herein at least with reference to processor 1000 of FIG. 10), for performing such operations. In at least one embodiment, biometric authentication module 42 is configured to perform, when executed by one or more processors, one or more operations of the sets of operations.

Flow 800 may begin at 802, where the wearable device receives biometric input data (e.g., voice data, fingerprint data, etc.) according to the particular type of biometric sensor provisioned on the device. At 804, a determination is made as to whether a biometric authentication has been successful. Generally, a comparison may be made between the biometric input data and biometric credentials previously enrolled on wearable device. If the biometric input data corresponds to the biometric credentials, then the biometric input data is authenticated. Otherwise, the biometric authentication fails.

For a voice-enabled biometric authentication, however, both voice recognition and speech recognition may be performed. The voice recognition may be performed using the aforementioned comparison between the biometric input data and biometric credentials previously enrolled on wearable device. The speech recognition may be used to determine whether a particular voice trigger was spoken by the user. If either part of the authentication determination fails, then the biometric input data (and user) may not be authenticated. If the biometric authentication is not successful, as determined at 804, then at 814, appropriate action may be taken. For example, an authentication result (e.g., 'failed') may be sent to the smart device (primary or secondary) to which it is currently connected. In addition, wearable device may prevent any additional input data indicative of input from the user from being sent to the smart device.

If the authentication is successful, however, as determined at 804, then at 806, the wearable device may establish a secure wireless connection to a smart device within a wireless range of the wearable device. At 808, a determination may be made as to whether the smart device is in the trust group. This may be determined by searching trust group table 45 to find a device identifier corresponding to the smart device. In at least one embodiment, the smart device is determined to be in the trust group if its device identifier is mapped to a shared secret in trust group table 45. If the smart device is not in the trust group, then at 814, appropriate action can be taken, as previously described. If the smart device is in the trust group, however, then at 810, the biometric authentication is extended to the smart device. This can be accomplished by sending an authentication result indicating that the authentication was successful.

In another implementation, other input data, indicative of other input captured by the wearable device, may be forwarded to the smart device as an indication that the authentication was successful. For voice-enabled authentication and interaction with the smart device, the other input could be captured separately after the biometric input to be authenticated. For example, a voice trigger such as, "Hello smart device," could be spoken first and then an inquiry could be made, such as, "What is the weather today?" Alternatively, the other input could be captured contemporaneously with the biometric input to be authenticated. For example, a voice trigger combined with an inquiry such as, "Hello smart device, what is the weather today?" could be spoken without a pause between the words. At 812, other input data, indicative of other input captured by the wearable device, can be sent to the smart device until the authenticated session ends, or until another voice trigger is received (in the case of voice-enabled authentication).

Figure 9:
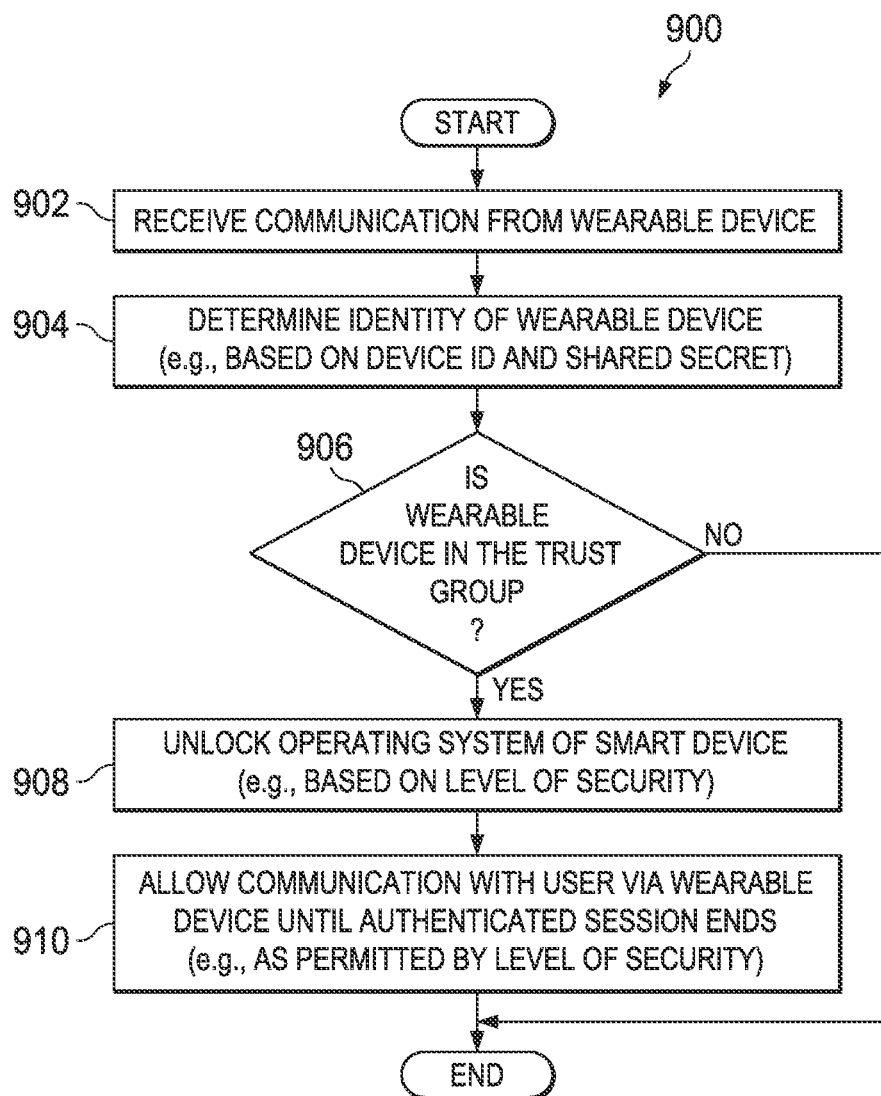
FIG. 9 is a simplified flow diagram illustrating activities associated with extending user authentication according to an embodiment of the present disclosure.

Turning to FIG. 9, FIG. 9 is a flowchart of a possible flow 900 illustrating activities that may be associated with embodiments described herein. In at least one embodiment, logic in the form of one or more sets of operations correspond to activities of FIG. 9. In an example, a smart device (primary or secondary), such as smart device 20 of FIG. 1, may perform one or more operations of the sets of operations. This smart device may comprise means, including for example, one or more processors (e.g., further described herein at least with reference to processor 1000 of FIG. 10), for performing such operations. In at least one embodiment, security proxy 22 is configured to perform, when executed by one or more processors, one or more operations of the sets of operations.

Flow 900 may begin at 902, where a smart device (primary or secondary) receives a communication from a wearable device. At 904, the smart device may determine the identity of the wearable device based on information that uniquely identifies the wearable device. In one embodiment, the smart device may use a mapping between a device identifier corresponding to the wearable device and a shared secret of the wireless connection to the wearable device. At 906, a determination is made as to whether the wearable device is in the trust group, based on the device ID and shared secret. If the wearable device is not in the trust group, as determined at 906, then flow 900 may end and the operating system can remain locked. If the wearable device is in the trust group, however, then at 908 the security proxy may unlock the operating system of the smart device. In at least one embodiment, the wearable device only sends a communication when the user has been authenticated.

Therefore, the smart device unlocks the operating system whenever it receives a communication from the wearable device. In some other embodiments, access to services and applications may be controlled by the security proxy based on a level of security. The level of security, and whether to unlock the operating system, may be determined based on an authentication result that the security proxy receives from the wearable device. At 910, the security proxy may allow communication with the user via the wearable device until the authenticated session ends, or as permitted by the level of security.

Figure 10:
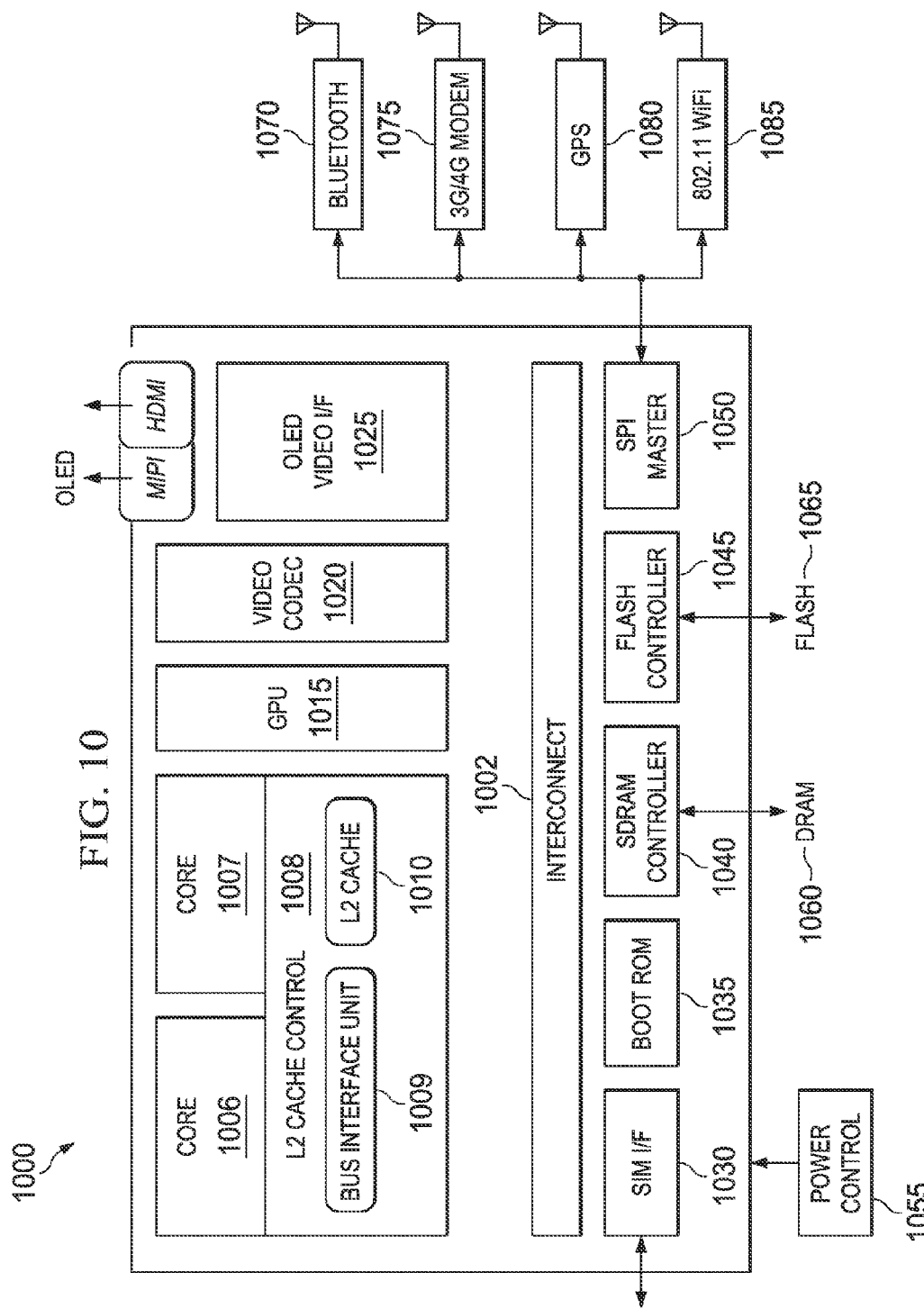
FIG. 10 is a simplified block diagram associated with an example ecosystem on chip (SOC) of the present disclosure.

FIG. 10 is a simplified block diagram associated with an example ecosystem SOC 1000 of the present disclosure. At least one example implementation of the present disclosure can include integration of the wearable electronic device features and/or smart device features discussed herein and an ARM component. For example, the example of FIG. 10 can be associated with any ARM core (e.g., A-9, A-15, etc.). Further, the architecture can be part of any type of wearable electronic device, smart device, tablet, smartphone (inclusive of Android™ phones, i-Phones™), i-Pad™, Google Nexus™, Microsoft Surface™, video processing components, laptop computer (inclusive of any type of notebook), Ultrabook™ system, any type of touch-enabled input device, etc.

In the example of FIG. 10, ARM ecosystem SOC 1000 may include multiple cores 1006-1007, an L2 cache control 1008, a bus interface unit 1009, an L2 cache 1010, a graphics processing unit (GPU) 1015, an interconnect 1002, a video codec 1020, and an organic light emitting diode (OLED) display I/F 1025, which may be associated with mobile industry processor interface (MIPI)/high-definition multimedia interface (HDMI) links that couple to an OLED.

ARM ecosystem SOC 1000 may also include a subscriber identity module (SIM) I/F 1030, a boot read-only memory (ROM) 1035, a synchronous dynamic random access memory (SDRAM) controller 1040, a flash controller 1045, a serial peripheral interface (SPI) master 1050, a suitable power control 1055, a dynamic RAM (DRAM) 1060, and flash 1065. In addition, one or more embodiments include one or more communication capabilities, interfaces, and features such as instances of Bluetooth™ 1070, a 3G/4G modem 1075, a global positioning system (GPS) 1080, and an 802.11 WiFi 1085.

In operation, the example of FIG. 10 can offer processing capabilities, along with relatively low power consumption to enable computing of various types (e.g., mobile computing). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one embodiment, the core processor may implement an out-of-order superscalar pipeline with a coupled low-latency level-2 cache.

Figure 11:
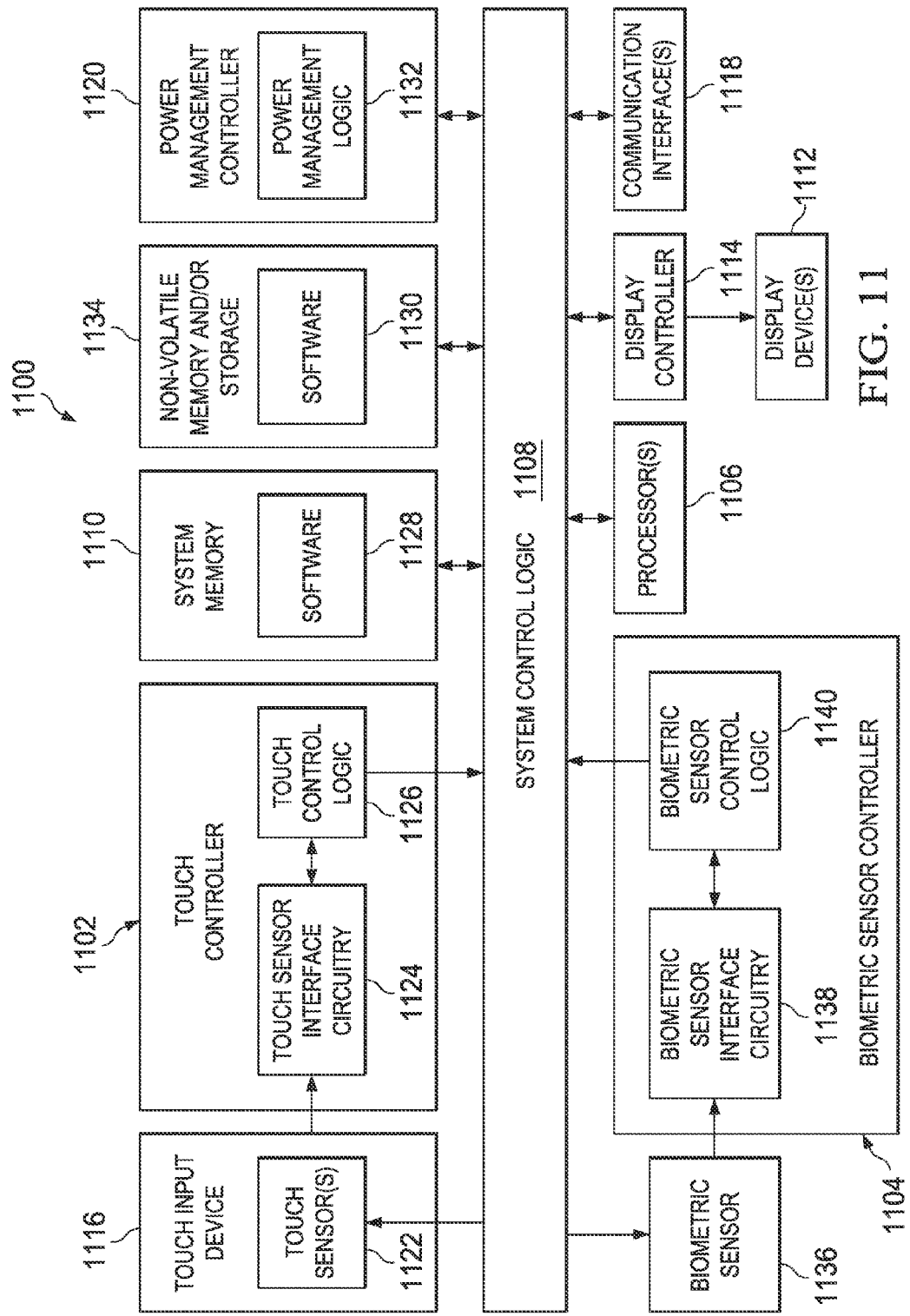
FIG. 11 is a simplified block diagram illustrating example logic that may be used to execute activities associated with the present disclosure.

Turning to FIG. 11, FIG. 11 is a simplified block diagram illustrating potential electronics and logic that may be associated with wearable electronic device 40 discussed herein. In at least one example embodiment, system 1100 can include a touch controller 1102, fingerprint sensor controller 1104, one or more processors 1106, system control logic 1108 coupled to at least one of processor(s) 1106, system memory 1110 coupled to system control logic 1108, non-volatile memory and/or storage device(s) 1134 coupled to system control logic 1108, display controller 1114 coupled to system control logic 1108, display controller 1114 coupled to one or more display device(s) 1112, power management controller 1120 coupled to system control logic 1108, and/or communication interfaces 1118 coupled to system control logic 1108.

Hence, the basic building blocks of any wearable electronic device system (e.g., processor, controller, memory, I/O, display, etc.) can be used in conjunction with the teachings of the present disclosure. Certain components could be discrete or integrated into a System on Chip (SoC). Some general system implementations can include certain types of form factors in which system 1100 is part of a more generalized enclosure. In alternate implementations, instead of wearable electronic devices, certain alternate embodiments deal with other smart devices such as mobile phones, tablet devices, etc.

System control logic 1108, in at least one embodiment, can include any suitable interface controllers to provide for any suitable interface to at least one processor 1106 and/or to any suitable device or component in communication with system control logic 1108. System control logic 1108, in at least one embodiment, can include one or more memory controllers to provide an interface to system memory 1110. System memory 1110 may be used to load and store data and/or instructions, for example, for system 1100. System memory 1110, in at least one embodiment, can include any suitable volatile memory, such as suitable dynamic random access memory (DRAM) for example. System control logic 1108, in at least one embodiment, can include one or more I/O controllers to provide an interface to display device 1112, touch controller 1102, and non-volatile memory and/or storage device(s) 1134.

Non-volatile memory and/or storage device(s) 1134 may be used to store data and/or instructions, for example within software 1130. Non-volatile memory and/or storage device(s) 1134 may include any suitable non-volatile memory, such as flash memory for example, and/or may include any suitable non-volatile storage device(s), such as one or more hard disc drives (HDDs), solid state drives (SSDs), etc. for example.

Power management controller 1120 may include power management logic 1132 configured to control various power management and/or power saving functions. In at least one example embodiment, power management controller 1120 is configured to reduce the power consumption of components or devices of system 1100 that may either be operated at reduced power or turned off when the wearable electronic device is in an inactive state (e.g., not being accessed, etc.). For example, in at least one embodiment, when the wearable electronic device is in an inactive state, power management controller 1120 performs one or more of the following: power down the unused portion of the display and/or any backlight associated therewith; allow one or more of processor(s) 1106 to go to a lower power state if less computing power is required in the closed configuration; and shutdown any devices and/or components (e.g., wireless module) that may be unused when an electronic device is in an inactive state.

Communications interface(s) 1118 may provide an interface for system 1100 to communicate over one or more networks and/or with any other suitable device. Communications interface(s) 1118 may include any suitable hardware and/or firmware. Communications interface(s) 1118, in at least one example embodiment, may include, for example, a network adapter, a wireless network adapter, a telephone modem, and/or a wireless modem. System control logic 1108, in at least one embodiment, can include one or more I/O controllers to provide an interface to any suitable input/output device(s) such as, for example, an audio device to help convert sound into corresponding digital signals and/or to help convert digital signals into corresponding sound, a camera or a camcorder.

For at least one embodiment, at least one processor 1106 may be packaged together with logic for one or more controllers of system control logic 1108. In at least one embodiment, at least one processor 1106 may be packaged together with logic for one or more controllers of system control logic 1108 to form a System in Package (SiP). In at least one embodiment, at least one processor 1106 may be integrated on the same die with logic for one or more controllers of system control logic 1108. For at least one embodiment, at least one processor 1104 may be integrated on the same die with logic for one or more controllers of system control logic 1108 to form a System on Chip (SoC).

For touch control, touch controller 1102 may include touch sensor interface circuitry 1124 and touch control logic 1126. Touch sensor interface circuitry 1124 may be coupled to one or more touch sensor(s) 1122 to detect touch input(s) over a first touch surface layer and a second touch surface layer of a display (e.g., at least one display device 1112). Touch sensor interface circuitry 1124 may include any suitable circuitry that may depend, for example, at least in part on the touch-sensitive technology used for a touch input device 1116, which may include one or more touch sensor(s) 1122. Touch sensor interface circuitry 1124, in one embodiment, may support any suitable multi-touch technology. Touch sensor interface circuitry 1124, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Touch control logic 1126 may be coupled to help control touch sensor interface circuitry 1124 in any suitable manner to detect touch input over a first touch surface layer and a second touch surface layer. Touch control logic 1126 for at least one example embodiment may also be coupled to output in any suitable manner digital touch input data corresponding to touch input detected by touch sensor interface circuitry 1124. Touch control logic 1126 may be implemented using any suitable logic, including any suitable hardware, firmware, and/or software logic (e.g., non-transitory tangible media), that may depend, for example, at least in part on the circuitry used for touch sensor interface circuitry 1124. Touch control logic 1126 for at least one embodiment may support any suitable multi-touch technology.

Touch control logic 1126 may be coupled to output digital touch input data to system control logic 1108 and/or at least one processor 1106 for processing. At least one processor 1106 for at least one embodiment may execute any suitable software to process digital touch input data output from touch control logic 1126. Suitable software may include, for example, any suitable driver software and/or any suitable application software.

For fingerprint sensor control, fingerprint sensor controller 1104 may include touch sensor interface circuitry 1138 and fingerprint sensor control logic 1140. Fingerprint sensor interface circuitry 1138 may be coupled to a fingerprint sensor 1136 to control operation of fingerprint sensor 1136 and receive one or more captured fingerprints that may be captured over a surface layer of a display (e.g., at least one display device 1112) using fingerprint sensor 1136. Fingerprint sensor interface circuitry 1138 may include any suitable circuitry that may depend, for example, at least in part on the fingerprint sensor technology for fingerprint sensor 1136. Fingerprint sensor interface circuitry 1138, in one or more embodiments, may support any suitable multi-fingerprint capturing technology. Fingerprint sensor interface circuitry 1138, in at least one embodiment, can include any suitable circuitry to convert analog signals corresponding to a captured fingerprint into any suitable digital fingerprint data. Suitable digital fingerprint data for at least one embodiment may include, for example, a fingerprint image or capacitive ridge/valley measurement data for a fingerprint.

For biometric sensors, one or more biometric sensor controllers 1104 may include biometric sensor interface circuitry 1142 and biometric sensor control logic (e.g., for voice sensor control, fingerprint sensor control, eye sensor control, facial feature sensor control, hand sensor control, etc.). Biometric sensor interface circuitry 1142 may be coupled to a biometric sensor (e.g., microphone, fingerprint sensor, eye sensor (retinas and/or irises), facial feature sensor, hand sensor (geometry and/or palm print), etc.) to control the operation of the particular biometric sensor and receive the particular inputs (e.g., voice patterns, fingerprints, retina and/or iris measurements, hand geometry, palm print, etc.). Biometric sensor circuitry 1142 may include any suitable circuitry that may depend, for example, at least in part on the particular technology (e.g., voice and/or speech sensor technology, fingerprint sensor technology, facial feature sensor technology, hand geometry sensor technology, palm print sensor technology, etc.) used for the particular biometric sensor. For example, biometric sensor interface circuitry 1142 for a fingerprint sensor may support multi-fingerprint capturing technology. In another example, biometric sensor interface circuitry 1142 for a microphone may support both voice recognition (i.e., identification of a particular user based on voice patterns) and speech recognition (i.e., recognition of particular speech content). Depending on the particular biometric sensor used, input sensor interface circuitry 1142 may also include suitable circuitry to convert analog signals into any suitable digital data.

Biometric sensor control logic 1144 may be coupled to control biometric sensor interface circuitry 1142 in any suitable manner to control the particular biometric sensor and to capture appropriate data. Biometric sensor control logic 1144, for at least one embodiment, may also be coupled to output in any suitable manner digital data detected by biometric sensor interface circuitry 1142. Biometric sensor control logic 1144 may be implemented using any suitable logic, including any suitable hardware, firmware, and/or software logic (e.g., non-transitory tangible media), that may depend, for example, at least in part on the circuitry used for biometric sensor interface circuitry 1142. Biometric sensor control logic 1144, for at least one embodiment, may support any suitable voice recognition technology, speech recognition technology, retina and/or iris recognition data, single or multi-fingerprint capturing technology, hand measurement technology, palm print capturing technology, and any other technology associated with the particular sensor being used.

Biometric sensor control logic 1144 may be coupled to output digital data (e.g., voice data, fingerprint data, eye data, hand data, palm data, etc.) to system control logic 1108 and/or at least one processor 1106 for processing. At least one processor 1106 for at least one embodiment may execute any suitable software to process the digital data output from biometric sensor control logic 1144. For example, digital data may, in one or more embodiments, be processed to verify the digital data based on biometric credentials of an authorized user that may be stored in non-volatile memory and/or storage 734 or in suitable storage in the cloud. Suitable software may include, for example, any suitable driver software and/or any suitable application software. As illustrated in FIG. 11, system memory 1110 may store suitable software 1128 and/or non-volatile memory and/or storage device(s) may store any suitable software 1134.

It will be apparent that, depending on the particular wearable electronic device or smart device, other components may be present in particular wearable electronic device or smart device that are not shown in FIGS. 10-11. Conversely, not all components illustrated in FIGS. 10-11 will necessarily be present in a particular wearable electronic device or smart device. By way of example, a headset may not include components enabling video display and interaction (e.g., video codec 1020, OLED video I/F 1025, display controller 1114, display devices 712, touch input device 1116, touch sensors 722, touch controller 1102, touch sensor interface circuitry 1124, touch control logic 1126). In another example, a secondary smart device, which is added to a trust group after a primary smart device has enrolled a user's authentication credentials with a wearable electronic device, may or may not include any biometric technology (e.g., biometric sensor 1136, biometric sensor controller 1104, biometric sensor interface circuitry 1138, biometric sensor control logic 1140).

Note that in some example implementations, the functions outlined herein may be implemented in conjunction with logic that is encoded in one or more tangible, non-transitory computer readable storage media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

Wearable devices (e.g., 40, 60, 90), smart devices (e.g., 20, 71, 72(1)-72(N)), and network elements in the cloud may keep data and information in any suitable memory element (e.g., random access memory (RAM), read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, an application specific integrated circuit (ASIC), or other types of nonvolatile machine-readable media that are capable of storing data and information), software, hardware, firmware, or in any other suitable component, device, element, or object where appropriate and based on particular needs. Any of the memory items discussed herein should be construed as being encompassed within the broad term 'memory element.' Moreover, the information being used, stored, tracked, sent, or received in wearable devices, smart devices, and network elements in the cloud, could be provided in any storage structure including, but not limited to, a repository, database, register, queue, table, or cache, all of which could be referenced at any suitable timeframe. Any such storage structures (e.g., trust group table 45, biometric credential files 43, etc.) may also be included within the broad term 'memory element' as used herein.

It is imperative to note that all of the specifications, dimensions, and relationships outlined herein (e.g., size, materials, etc.), in addition to other protocols and relationships (e.g., specific operations, timing intervals, etc.) have only been offered for purposes of example and teaching only. Each of these data may be varied considerably without departing from the spirit of the present disclosure, or the scope of the appended claims. The specifications apply to non-limiting examples and, accordingly, they should be construed as such.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

The following examples pertain to embodiments in accordance with this Specification. Note that all optional features of the apparatuses and systems described above may also be implemented with respect to the method or process described herein and specifics in the examples may be used anywhere in one or more embodiments.

Example 1 is a wearable electronic device, comprising a biometric sensor, and logic, at least a portion of which is implemented in hardware, the logic configured to: receive input data indicative of biometric input; attempt to authenticate the input data based, at least in part, on at least one biometric credential of an authorized user; establish a wireless connection to a smart device; determine whether the smart device is included in a trust group of one or more smart devices; and send a communication to unlock the smart device when the input data is successfully authenticated and the trust group includes the smart device.

In Example 2, the subject matter of Example 1 can optionally include the logic being configured to receive the at least one biometric credential of the authorized user from one of the smart device and a cloud.

In Example 3, the subject of matter of any one of Examples 1-2 can optionally include one or more memory elements, where the logic is configured to store the at least one biometric credential in the one or more memory elements.

In Example 4, the subject of matter of any one of Examples 1-3 can optionally include the logic being configured to determine the smart device is included in the trust group when information uniquely identifying the smart device is stored in a memory element associated with the trust group.

In Example 5, the subject of matter of Example 4 can optionally include the memory element including a mapping between a device identifier of the smart device and a shared secret used to secure the wireless connection.

In Example 6, the subject of matter of any one of Examples 1-5 can optionally include the logic being configured to receive other input data indicative of other biometric input, wherein the communication includes the other input data.

In Example 7, the subject of matter of any one of Examples 1-6 can optionally include the logic being configured to not send the communication to unlock the smart device when the input data is not successfully authenticated.

In Example 8, the subject of matter of any one of Examples 1-6 can optionally include the logic being further configured to send an authentication result to the smart device, wherein the authentication result indicates whether the input data was successfully authenticated.

In Example 9, the subject of matter of any one of Examples 1-8 can optionally include the biometric sensor including a voice sensor, the logic being configured to authenticate the input data based on verifying a voice trigger in the input data and verifying a voice represented by the input data corresponds to a voice of the authorized user.

In Example 10, the subject of matter of any one of Examples 1-8 can optionally include the biometric sensor including one of a voice sensor, a fingerprint sensor, an eye sensor, and a hand sensor.

In Example 11, the subject of matter of any one of Examples 1-5 and 7-10 can optionally include the logic being configured to: receive other input data indicative of user input to access an application or service on the smart device; and send the other input data to the smart device.

In Example 12, the subject of matter of Example 11 can optionally include a type of the user input being distinct from a type of the biometric input.

Example 13 is at least one computer readable storage medium comprising instructions for a wearable electronic device that, when executed by at least one processor, cause the at least one processor to: receive input data indicative of biometric input; attempt to authenticate the input data based, at least in part, on at least one biometric credential of an authorized user; establish a wireless connection to a smart device; determine whether the smart device is included in a trust group of one or more smart devices; and send a communication to unlock the smart device when the input data is successfully authenticated and when the trust group includes the smart device.

In Example 14, the subject matter of Example 13 can optionally include the instructions, when executed by the at least one processor, causing the at least one processor to receive the at least one biometric credential of the authorized user from one of the smart device and a cloud.

In Example 15, the subject matter of any one of Examples 13-14 can optionally include the instructions, when executed by the at least one processor, causing the at least one processor to store the at least one biometric credential in one or more memory elements.

In Example 16, the subject matter of any one of Examples 13-15 can optionally include the instructions, when executed by the at least one processor, causing the at least one processor to determine the smart device is included in the trust group when information uniquely identifying the smart device is stored in a memory element associated with the trust group.

In Example 17, the subject matter of Example 16 can optionally include the memory element including a mapping between a device identifier of the smart device and a shared secret used to secure the wireless connection.

In Example 18, the subject matter of any one of Examples 13-17 can optionally include the instructions, when executed by the at least one processor, causing the at least one processor to receive other input data indicative of other biometric input, where the communication includes the other input data.

In Example 19, the subject matter of any one of Examples 13-18 can optionally include the instructions, when executed by the at least one processor, causing the at least one processor to not send the communication to unlock the smart device when the input data is not successfully authenticated.

In Example 20, the subject matter of any one of Examples 13-18 can optionally include the instructions, when executed by the at least one processor, causing the at least one processor to send an authentication result to the smart device, where the authentication result indicates whether the input data was successfully authenticated.

In Example 21, the subject matter of any one of Examples 13-20 can optionally include the biometric sensor including a voice sensor, where the instructions, when executed by the at least one processor, are configured to authenticate the input data based on verifying a voice trigger in the input data and verifying a voice represented by the input data corresponds to a voice of the authorized user.

In Example 22, the subject matter of any one of Examples 13-20 can optionally include the biometric sensor including one of a voice sensor, a fingerprint sensor, an eye sensor, and a hand sensor.

In Example 23, the subject matter of any one of Examples 13-17 and 19-22 can optionally include the instructions, when executed by the at least one processor, causing the at least one processor to: receive other input data indicative of user input to access an application or service on the smart device; and send the other input data to the smart device.

In Example 24, the subject matter of Example 23 can optionally a type of the user input being distinct from a type of the biometric input.

Example 25 is a method for a wearable electronic device, comprising: receiving input data indicative of biometric input; attempting to authenticate the input data based, at least in part, on at least one biometric credential of an authorized user; establishing a wireless connection to a smart device; determining whether the smart device is included in a trust group of one or more smart devices; and sending a communication to unlock the smart device when the input data is successfully authenticated and when the trust group includes the smart device.

In Example 26, the subject matter of Example 25 can optionally include receiving the at least one biometric credential of the authorized user from one of the smart device and a cloud.

In Example 27, the subject matter of any one of Examples 25-26 can optionally include storing the at least one biometric credential in one or more memory elements.

In Example 28, the subject matter of any one of Examples 25-27 can optionally include determining the smart device is included in the trust group when information uniquely identifying the smart device is stored in a memory element associated with the trust group.

In Example 29, the subject matter of Example 28 can optionally include the memory element including a mapping between a device identifier of the smart device and a shared secret used to secure the wireless connection.

In Example 30, the subject matter of any one of Examples 25-29 can optionally include receiving other input data indicative of other biometric input, where the communication includes the other input data.

In Example 31, the subject matter of any one of Examples 25-30 can optionally include the communication to unlock the smart device not being sent to the smart device when the input data is not successfully authenticated.

In Example 32, the subject matter of any one of Examples 25-30 can optionally include sending an authentication result to the smart device, where the authentication result indicates whether the input data was successfully authenticated.

In Example 33, the subject matter of any one of Examples 25-32 can optionally include the biometric sensor including a voice sensor, where the method can optionally include authenticating the input data based on verifying a voice trigger in the input data and verifying a voice represented by the input data corresponds to a voice of the authorized user.

In Example 34, the subject matter of any one of Examples 25-32 can optionally include the biometric sensor including one of a voice sensor, a fingerprint sensor, an eye sensor, and a hand sensor.

In Example 35, the subject matter of any one of Examples 25-29 and 31-34 can optionally include receiving other input data indicative of user input to access an application or service on the smart device; and sending the other input data to the smart device.

In Example 36, the subject matter of Example 35 can optionally include a type of the user input being distinct from a type of the biometric input.

Example 37 is an apparatus for extending authentication to a smart device, the apparatus comprising means for performing the method of any one of Examples 25-36.

In Example 38, the subject matter of Example 37 can optionally include the means for performing the method comprising at least one processor and at least one memory element.

In Example 39, the subject matter of Example 38 can optionally include the at least one memory element comprising machine readable instructions that when executed, cause the apparatus to perform the method of any one of Examples 25-36.

In Example 40, the subject matter of any one of Examples 37-39 can optionally include the apparatus being a wearable electronic device.

Example 41 is at least one computer readable storage medium comprising instructions for a smart device that, when executed by at least one processor, cause the at least one processor to: generate at least one biometric credential of a user; send the at least one biometric credential to a wearable electronic device; receive, on the smart device, a communication; determine identity information of a sender of the communication; and unlock the smart device when the identity information indicates the sender is the wearable electronic device.

In Example 42, the subject matter of Example 41 can optionally include the identity information including a device identifier corresponding to the sender and a shared secret associated with a wireless connection between the smart device and the sender.

In Example 43, the subject matter of any one of Examples 41-42 can optionally include the instructions, when executed by the at least one processor, causing the at least one processor to: determine, prior to receiving the communication, identity information of the wearable electronic device; and store the identity information of the wearable electronic device.

In Example 44, the subject matter of Example 43 can optionally include the instructions, when executed by the at least one processor, causing the at least one processor to compare the identity information of the sender to the stored identity information of the wearable electronic device to determine whether the sender is the wearable electronic device.

In Example 45, the subject matter of any one of Examples 41-44 can optionally include the at least one biometric credential being based on a biometric characteristic of the user, the biometric characteristic including one of a voice, a fingerprint, an eye, facial features, and hand features.

In Example 46, the subject matter of any one of Examples 41-45 can optionally include the communication including a command to enable voice recognition by the smart device and the instructions, when executed by the at least one processor, causing the at least one processor to receive a subsequent communication from the wearable electronic device that includes voice input data.

In Example 47, the subject matter of Example 46 can optionally include the instructions, when executed by the at least one processor, causing the at least one processor to provide the voice input data to a personal assistant application on the smart device.

In Example 48, the subject matter of any one of Examples 41-47 can optionally include the instructions, when executed by the at least one processor, causing the at least one processor to: receive an authentication result indicating whether an authentication of input data indicative of biometric input by a user was successful; and allow selective access to applications and services on the smart device based on the authentication result.

Example 49 is a method for protecting private data on a smart device, the method comprising: generating at least one biometric credential of a user; sending the at least one biometric credential to a wearable electronic device; receiving, on the smart device, a communication; determining identity information of a sender of the communication; and unlocking the smart device when the identity information indicates the sender is the wearable electronic device.

In Example 50, the subject matter of Example 49 can optionally include the identity information including a device identifier corresponding to the sender and a shared secret associated with a wireless connection between the smart device and the sender.

In Example 51, the subject matter of any one of Examples 49-50 can optionally include determining, prior to receiving the communication, identity information of the wearable electronic device; and storing the identity information of the wearable electronic device.

In Example 52, the subject matter of Example 51 can optionally include comparing the identity information of the sender to the stored identity information of the wearable electronic device to determine whether the sender is the wearable electronic device.

In Example 53, the subject matter of any one of Examples 49-52 can optionally include at least one biometric credential being based on a biometric characteristic of the user, the biometric characteristic including one of a voice, a fingerprint, an eye, facial features, and hand features.

In Example 54, the subject matter of any one of Examples 49-53 can optionally include the communication including a command to enable voice recognition by the smart device, and further including receiving a subsequent communication from the wearable electronic device that includes voice input data.

In Example 55, the subject matter of Example 54 can optionally include providing the voice input data to a personal assistant application on the smart device.

In Example 56, the subject matter of any one of Examples 49-55 can optionally include receiving an authentication result indicating whether an authentication of input data indicative of biometric input by a user was successful; and allowing selective access to applications and services on the smart device based on the authentication result.

Example 57 is an apparatus for protecting data, the apparatus comprising means for performing the method of any one of Examples 49-56.

In Example 58, the subject matter of Example 57 can optionally include the means for performing the method comprising at least one processor and at least one memory element.

In Example 59, the subject matter of Example 58 can optionally include the at least one memory element comprising machine readable instructions that when executed, cause the apparatus to perform the method of any one of Examples 49-56.

In Example 60, the subject matter of any one of Examples 57-59 can optionally include the apparatus being a smart device.

What is claimed is:

1. A wearable electronic device, comprising:
   a biometric sensor including at least one of a voice sensor, a fingerprint sensor, an eye sensor, a facial feature sensor, a pulse sensor, or a hand sensor; and
   logic, at least a portion of which is implemented in hardware, the logic configured to:
      receive first input data indicative of biometric input;
      establish a wireless connection to a smart device upon the first input data being authenticated by the wearable electronic device based, at least in part, on at least one biometric credential of an authorized user, wherein the smart device is an electronic device capable of wireless communication exchanges with the wearable electronic device;
      determine the smart device is included in a trust group of smart devices based on determining a device identifier of the smart device is mapped to a shared secret in a trust group table in the wearable electronic device, the mapping in the trust group table established a priori based on a prior wireless connection between the smart device and the wearable electronic device, wherein for each smart device of the trust group, a respective device identifier is mapped to a unique shared secret established between that smart device of the trust group and the wearable electronic device;
      receive second input data indicative of user input to access the smart device; and
   send a communication to unlock the smart device upon a first condition and a second condition being satisfied, the first condition being that the first input data is successfully authenticated by the wearable electronic device and the second condition being that the trust group is determined to include the smart device, wherein the communication is based on the second input data indicative of user input to access the smart device.

2. The wearable electronic device of claim 1, wherein the logic is configured to receive the at least one biometric credential of the authorized user from the smart device or the cloud.

3. The wearable electronic device of claim 2, further comprising:
   one or more memory elements, wherein the logic is configured to store the at least one biometric credential in the one or more memory elements.

4. The wearable electronic device of claim 1, wherein the device identifier includes information uniquely identifying the smart device.

5. The wearable electronic device of claim 1, wherein the shared secret is used to encrypt communications sent over the wireless connection.

6. The wearable electronic device of claim 1, wherein the second input data includes other biometric input.

7. The wearable electronic device of claim 1, wherein the logic is configured to:
   not send the communication to unlock the smart device when the first input data is not successfully authenticated.

8. The wearable electronic device of claim 1, wherein the logic is further configured to:
   send an authentication result to the smart device, wherein the authentication result indicates whether the first input data was successfully authenticated.

9. The wearable electronic device of claim 1, wherein the biometric sensor includes a voice sensor, wherein the logic is configured to authenticate the first input data based on verifying a voice trigger in the first input data and verifying a voice represented by the first input data corresponds to a voice of the authorized user.

10. The wearable electronic device of claim 1, wherein the biometric sensor includes one or more other sensors selected from a group of sensors including a voice sensor, a fingerprint sensor, an eye sensor, a facial features sensor, a pulse sensor, and a hand sensor.

11. The wearable electronic device of claim 1, wherein the wireless connection between the smart device and the wearable electronic device is secured using the shared secret.

12. The wearable electronic device of claim 11, wherein the shared secret is created during a process to enable secure wireless connections between the wearable electronic device and the smart device.

13. At least one non-transitory computer readable storage medium comprising instructions for a wearable electronic device that, when executed by at least one processor, cause the at least one processor to:
   receive first input data indicative of biometric input, wherein the wearable electronic device includes at least one of a voice sensor, a fingerprint sensor, an eye sensor, a facial feature sensor, a pulse sensor, or a hand sensor;
   establish a wireless connection to a smart device upon the first input data being authenticated by the wearable electronic device based, at least in part, on at least one biometric credential of an authorized user, wherein the smart device is an electronic device capable of wireless communication exchanges with the wearable electronic device;
   determine the smart device is included in a trust group of smart devices based on determining a device identifier of the smart device is mapped to a shared secret in a trust group table in the wearable electronic device, the mapping in the trust group table established a priori based on a prior wireless connection between the smart device and the wearable electronic device, wherein for each smart device of the trust group, a respective device identifier is mapped to a unique shared secret established between that smart device of the trust group and the wearable electronic device;

receive second input data indicative of user input to access the smart device; and send a communication to unlock the smart device upon a first condition and a second condition being satisfied, the first condition being that the first input data is successfully authenticated by the wearable electronic device and the second condition being that the trust group is determined to include the smart device, wherein the communication is based on the second input data indicative of user input to access the smart device.

14. The at least one non-transitory computer readable storage medium of claim 13, comprising instructions that, when executed by the at least one processor, cause the at least one processor to:

receive the at least one biometric credential of the authorized user from one of the smart device and a cloud.

15. The at least one non-transitory computer readable storage medium of claim 13, wherein the second input data is indicative of user input to access an application or service on the smart device.

16. The at least one non-transitory computer readable storage medium of claim 15, wherein a type of the user input is distinct from a type of the biometric input.

17. The at least one non-transitory computer readable storage medium of claim 13, wherein the wearable electronic device includes one or more other biometric sensors to receive one or more other biometric input.

18. The at least one non-transitory computer readable storage medium of claim 13, wherein the second input data includes other biometric input.

19. The at least one non-transitory computer readable storage medium of claim 13, comprising instructions that, when executed by the at least one processor, cause the at least one processor to:

not send the communication to unlock the smart device when the first input data is not successfully authenticated.

20. The at least one non-transitory computer readable storage medium of claim 13, comprising instructions that, when executed by the at least one processor, cause the at least one processor to:

send an authentication result to the smart device, wherein the authentication result indicates whether the first input data was successfully authenticated.

21. The at least one non-transitory computer readable storage medium of claim 13, wherein the wireless connection between the smart device and the wearable electronic device is secured using the shared secret.

22. A method for a wearable electronic device, comprising:

receiving first input data indicative of biometric input, wherein the wearable electronic device includes at least one of a voice sensor, a fingerprint sensor, an eye sensor, a facial feature sensor, a pulse sensor, or a hand sensor;

establishing a wireless connection to a smart device upon the first input data being authenticated by the wearable electronic device based, at least in part, on at least one biometric credential of an authorized user, wherein the smart device is an electronic device capable of wireless communication exchanges with the wearable electronic device;

determining the smart device is included in a trust group of smart devices based on determining a device identifier of the smart device is mapped to a shared secret in a trust group table in the wearable electronic device, the mapping in the trust group table established a priori based on a prior wireless connection between the smart device and the wearable electronic device, wherein for each smart device of the trust group, a respective device identifier is mapped to a unique shared secret established between that smart device of the trust group and the wearable electronic device;

receiving second input data indicative of user input to access the smart device; and sending a communication to unlock the smart device upon a first condition and a second condition being satisfied, the first condition being that the first input data is successfully authenticated by the wearable electronic device and the second condition being that the trust group is determined to include the smart device, wherein the communication is based on the second input data indicative of user input to access the smart device.

23. The method of claim 22, further comprising:

receiving the at least one biometric credential of the authorized user from one of the smart device and a cloud.

24. The method of claim 22, wherein the device identifier includes information uniquely identifying the smart device.

25. The method of claim 22, wherein the wearable electronic device includes one or more other biometric sensors to receive one or more other biometric input.

* * * * *